United States Patent
Johnson, Jr. et al.

(10) Patent No.: US 6,314,007 B2
(45) Date of Patent: Nov. 6, 2001

(54) MULTI-MODE POWER CONVERTERS INCORPORATING BALANCER CIRCUITS AND METHODS OF OPERATION THEREOF

(75) Inventors: Robert W. Johnson, Jr.; William J. Raddi, both of Raleigh, NC (US)

(73) Assignee: Powerware Corporation, Raleigh, NC (US)

( * ) Notice: Subject to any disclaimer, the term of this patent is extended or adjusted under 35 U.S.C. 154(b) by 0 days.

(21) Appl. No.: 09/756,505

(22) Filed: Jan. 8, 2001

Related U.S. Application Data

(63) Continuation of application No. 09/575,042, filed on May 19, 2000, which is a continuation of application No. 09/374,180, filed on Aug. 13, 1999, now abandoned.

(51) Int. Cl.$^7$ ............................. H02M 5/458; H02M 5/45
(52) U.S. Cl. ............................. 363/37; 363/58; 363/132; 307/66
(58) Field of Search ................................. 363/17, 34, 37, 363/58, 98, 132; 307/66

(56) References Cited

U.S. PATENT DOCUMENTS

| | | | |
|---|---|---|---|
| 4,894,765 | 1/1990 | Kahkipuro | 363/124 |
| 5,111,374 | 5/1992 | Lai et al. | 363/37 |
| 5,111,376 | 5/1992 | Mehl | 363/71 |
| 5,126,585 | 6/1992 | Boys | 307/66 |
| 5,229,650 | 7/1993 | Kita et al. | 307/66 |
| 5,237,208 * | 8/1993 | Tominaga et al. | 307/66 |
| 5,343,079 | 8/1994 | Mohan et al. | 307/105 |
| 5,502,630 | 3/1996 | Rokhvarg | 363/84 |
| 5,644,483 | 7/1997 | Peng et al. | 363/37 |
| 5,710,696 | 1/1998 | Reynolds et al. | 363/37 |
| 5,781,422 | 7/1998 | Lavin et al. | 363/37 |
| 5,978,236 | 11/1999 | Faberman et al. | 363/37 |
| 6,005,362 | 12/1999 | Enjeti et al. | 318/479 |
| 6,014,322 | 1/2000 | Higashi et al. | 363/65 |

FOREIGN PATENT DOCUMENTS 1005 132 A2   5/2000   (EP) ................................. H02J/9/06

OTHER PUBLICATIONS

Rooij et al., "A Novel Unity Power Factor Low EMI Uninterruptible Power Supply," IEEE, 1996, pp. 1278–1283.

* cited by examiner

Primary Examiner—Bao Q. Vu
(74) Attorney, Agent, or Firm—Myers Bigel Sibley & Sajovec

(57) ABSTRACT

A power converter includes first and second voltage busses and a neutral bus. A first switching circuit, e.g., a rectifier circuit, is operative to selectively couple an input node thereof to the first and second voltage busses. A balancer circuit is operative to selectively couple the neutral bus to the first and second voltage busses such that relative magnitudes of respective first and second voltages on the first and second voltage busses are controlled responsive to respective first and second rates at which the balancer circuit couples the first and second voltage busses to the neutral bus. A second switching circuit, e.g., an inverter circuit, is operative to selectively couple the first and second voltage busses to a load connected at an output node thereof. The balancer circuit preferably includes first and second switches operative to selectively couple respective ones of the first and second voltage busses to the neutral bus through an inductance such that the relative magnitudes of the first and second voltages are controlled responsive to respective first and second duty cycles of the first and second switches. The power converter is capable of multiple operating modes and suitable for use in uninterruptible power supplies (UPSs).

42 Claims, 16 Drawing Sheets

MULTI-MODE POWER CONVERTERS INCORPORATING BALANCER CIRCUITS AND METHODS OF OPERATION THEREOF

RELATED APPLICATIONS

This application is a continuation of Ser. No. 09/575,042, filed May 19, 2000, which is a continuation of Ser. No. 09/374,180, filed Aug. 13, 1999, now abandoned.

FIELD OF THE INVENTION

The present invention relates to electrical power devices and methods of operation thereof, and more particularly, to power conversion devices and methods of operation thereof.

BACKGROUND OF THE INVENTION

Uninterruptible power supplies (UPSs) are power conversion devices that are commonly used to provide conditioned, reliable power for computer networks, telecommunications networks, medical equipment and the like. UPSs are widely used with computers and similar computing devices, including but not limited to personal computers, workstations, mini computers, network servers, disk arrays and mainframe computers, to insure that valuable data is not lost and that the device can continue to operate notwithstanding temporary loss of an AC utility source. UPSs typically provide power to such electronic equipment from a secondary source, such as a battery, in the event that a primary alternating current (AC) utility source drops out (blackout) or fails to provide a proper voltage (brownout).

Conventional UPSs may be classified into categories. Referring to FIG. 1, a typical off-line UPS disconnects a load from a primary AC source 10 when the primary AC source fails or is operating in a degraded manner, allowing the load to be served from a secondary source such as a battery. The AC power source 10 is connected in series with a switch $S_1$, producing an AC voltage across a load 20 when the switch $S_1$ is closed. Energy storage is typically provided in the form of a storage capacitor $C_S$. The secondary power source, here a battery B, is connected to the load 20 via a low voltage converter 30 and a transformer T. When the AC power source 10 fails, the switch $S_1$ is opened, causing the load to draw power from the battery B. The low voltage converter 30 typically is an inverter that produces a quasi-square wave or sine wave voltage on a first winding $L_1$ of the transformer T from a DC voltage produced by the battery B. The first winding $L_1$ is coupled to a second winding $L_2$ of the transformer T connected across the load 20. When the AC power source is operational, i.e., when the switch $S_1$ is closed, the battery B may be charged using the low-voltage converter 30 or a separate battery charger circuit (not shown).

A line interactive (LIA) UPS topology is illustrated in FIG. 2. Here, the transformer T has a third winding $L_3$ that may be connected in series with the load 20 using switches $S_2$, $S_3$ to "buck" or "boost" the voltage applied to the load 20. As with the offline UPS topology of FIG. 1, when the AC power source 10 fails, the switch $S_1$ can be opened to allow the load 20 to run off the battery B.

As illustrated in FIG. 3, a typical on-line UPS includes a rectifier 40 that receives an AC voltage from an AC power source 10, producing a DC voltage across a storage capacitor $C_S$ at an intermediate node 45. An inverter 50 is connected between the intermediate node 45, and is operative to produce an AC voltage across a load 20 from the DC voltage. As shown, a battery B is connected to the intermediate node 45 via a DC/DC converter 60, supplying auxiliary power. Alternatively, the DC/DC converter can be eliminated and a high-voltage battery (not shown) connected directly to the intermediate node 45.

Each of these topologies may have disadvantages. For example, typical conventional on-line and LIA UPSs for 60 Hz applications use 60 Hz magnetic components (e.g., transformers and inductors) that are sized for such frequencies, and thus may be large, heavy and expensive. LIA UPSs often exhibit step voltage changes that can affect the performance of the load. Conventional off-line, LIA and on-line UPSs often use large storage capacitors, which tend to be bulky and expensive, in order to maintain an acceptable output voltage under heavy loading conditions. Moreover, because conventional UPSs are typically designed to operate in only one of the above-described off-line, LIA or on-line modes, sellers of UPSs may be required to maintain large inventories including several different types of UPSs in order to meet a variety of different customer applications.

SUMMARY OF THE INVENTION

In light of the foregoing, it is an object of the present invention to provide improved power converters and methods of operating power converters for use in devices such as uninterruptible power supplies (UPSs).

It is another object of the present invention to provide power converters that can be operated in a number of different modes.

It is yet another object of the present invention to provide power converters that can utilize smaller magnetic components and storage capacitors.

These and other objects, features and advantages may be provided according to the present invention by power converters and methods of operation thereof in which a rectifier circuit produces first and second voltages (e.g., ±DC voltages) on first and second voltage busses from an AC input voltage produced by an AC power source, an inverter circuit produces an AC output voltage from the first and second voltages, and a balancer circuit controls the relative magnitudes of the first and second voltages responsive to respective first and second rates at which the balancer circuit couples the first and second voltage busses to a neutral bus of the AC power source. Preferably, the rectifier circuit includes first and second switches that selectively couple the first and second voltage busses to a phase bus of the AC power source through a first inductance, the inverter circuit includes third and fourth switches that selectively couple the first and second voltage busses to a load through a second inductance, and the balancer circuit includes fifth and sixth switches that selectively couple the first and second voltage bussed to the neutral bus through a third inductance, such as an inductor or transformer winding.

The use of circuit topologies as described herein can provide several advantages. The balancer circuit enables energy transfer between first and second storage capacitors connected between the neutral bus and the first and second voltage busses, respectively, thus allowing the storage capacitors to be smaller than the storage capacitors typically used in conventional power converters with comparable power ratings. The switches in the rectifier, inductor and balancer can be controlled such that the power converter can be operated in a number of different power transfer modes. A secondary power source, such as a battery, may also be coupled to the power converter via a winding of a transformer that also serves as an inductance for the balancer circuit. In one embodiment, this coupling may be achieved through a combination battery converter/battery charger circuit that can also charge the battery when the converter is running off an AC power source. According to another aspect of the present invention, switches in the balancer circuit can be operated at varying duty cycles in positive and negative half-cycles of the AC input voltage, which can allow the power converter to be operated in a more efficient manner.

In particular, according to one embodiment of the present invention, a power converter includes first and second voltage busses and a neutral bus. A first switching circuit, e.g., a rectifier circuit, is operative to selectively couple an input node thereof to the first and second voltage busses. A balancer circuit is operative to selectively couple the neutral bus to the first and second voltage busses such that relative magnitudes of respective first and second voltages on the first and second voltage busses are controlled responsive to respective first and second rates at which the balancer circuit couples the first and second voltage busses to the neutral bus. A second switching circuit, e.g., an inverter circuit, is operative to selectively couple the first and second voltage busses to a load at an output node thereof.

The balancer circuit preferably includes first and second switches operative to selectively couple respective ones of the first and second voltage busses to the neutral bus through an inductance, such that the relative magnitudes of the first and second voltages are controlled responsive to respective first and second duty cycles of the first and second switches. The balancer circuit preferably is responsive to an AC input voltage applied to the input node to vary the respective duty cycles at which the first and second switches operate.

In one embodiment of the present invention, a battery converter circuit may be switchably coupled to at least one of the first and second voltage busses. In one exemplary circuit implementation, the battery converter circuit may include an inductor configured to be connected in series with a battery. A first switch is operative to selectively couple one end of a series combination of a battery and the inductor to one of the first or second voltage busses. A second switch is operative to selectively couple the one end of the series combination of a battery and an inductor to another end of the series combination of a battery and the inductor.

In another embodiment of the present invention, the balancer circuit includes a transformer including a first winding having a first tap coupled to the first and second switches and a second tap coupled to the neutral bus. The first and second switches selectively couple the first tap of the transformer to the first and second voltage busses. The power converter may further include first and second diodes, the first diode having a cathode coupled to the first voltage bus, the second diode having a cathode coupled to an anode of the first diode and an anode coupled to the second voltage bus. The first winding of the transformer may have a first end tap coupled to the first and second switches, a second end tap coupled to the anode of the first diode and the cathode of the second diode, and a center tap coupled to the neutral bus. Alternatively, the converter may further include third and fourth switches. The first winding of the transformer may have a first end tap coupled to the first and second switches, a second end tap coupled to the third and fourth switches, and a center tap coupled to the neutral bus, wherein the third switch is operative to couple and decouple the second end tap of the first winding and the first voltage bus and the fourth switch is operative to couple and decouple the second end tap of the first winding and the second voltage bus.

In another embodiment according to the present invention, a second winding of the transformer is inductively coupled to the first winding. An AC voltage generating circuit is coupled to the second winding of the transformer and operative to apply an AC voltage thereto. The AC voltage generating circuit may include a battery converter circuit operative to generate an AC voltage on the second winding of the transformer from a DC voltage produced by a battery coupled to the battery converter circuit. The AC voltage generating circuit may include a combined battery converter/battery charger circuit that is operative to generate an AC voltage on the second winding of the transformer from a DC voltage produced by the battery, and to produce a DC voltage across the battery from an AC voltage induced on the second winding of the transformer.

According to another aspect of the present invention, a power converter includes a rectifier circuit configured to connect to an AC power source and operative to produce first and second DC voltages at first and second voltage busses, respectively, by selectively coupling the first and second voltage busses to the AC power source through a first inductance. First and second capacitors couple the first and second voltage busses, respectively, to a neutral bus. An inverter circuit is configured to connect to a load and operative to selectively couple the first and second voltage busses to the load through a second inductance. A balancer circuit is operative to selectively couple the first and second voltage busses to the neutral bus through a third inductance such that relative magnitudes of the first and second DC voltages are controlled responsive to respective first and second rates at which the balancer circuit couples the first and second voltage busses to the neutral bus.

In one embodiment of the present invention, the power converter includes a switch control circuit. The rectifier circuit includes a first inductor having a first terminal configured to receive an AC input voltage, a first switch responsive to the switch control circuit to couple and decouple a second terminal of the first inductor and the first voltage bus, and a second switch responsive to the switch control circuit to couple and decouple the second terminal of the first inductor and the second voltage bus. The inverter circuit includes a second inductor having a first terminal configured to connect to a load, a third switch responsive to the switch control circuit to couple and decouple a second terminal of the second inductor and the first voltage bus, and a fourth switch responsive to the switch control circuit to couple and decouple the second terminal of the second inductor and the second voltage bus. The balancer circuit may include a third inductor having a first terminal coupled to the neutral bus, a fifth switch responsive to the switch control circuit to couple and decouple a second terminal of the third inductor and the first voltage bus, and a sixth switch responsive to the switch control circuit to couple and decouple the second terminal of the third inductor and the second voltage bus.

According to other aspects of the present invention, power transfer between a load and an AC power source that produces an AC input voltage between a phase bus and a neutral bus is controlled. First and second voltage busses are selectively coupled to the phase bus through a first inductance to produce first and second DC voltages at first and second voltage busses, respectively. The first and second voltage busses are selectively coupled to the load through a second inductance. The first and second voltage busses are selectively coupled to the neutral bus through a third inductance such that relative magnitudes of the first and second DC voltages are controlled responsive to respective first and second rates at which the first and second voltage busses are coupled to the neutral bus.

According to yet another embodiment of the present invention, the first and second voltage busses are selectively coupled to phase bus by switching a first switch to couple and decouple the phase bus and the first voltage bus through a first inductor and by switching a second switch to couple and decouple the phase bus and the second voltage bus through the first inductor. The first and second voltage busses are selectively coupled to the load by switching a third switch to couple and decouple the first voltage bus and the load through a second inductor and by switching a fourth switch to couple and decouple the second voltage bus and the load bus through the second inductor. The switching is preferably performed responsive to the AC input voltage. In particular, the respective duty cycles at which the first, second, third and fourth switches are operated are varied responsive to the AC input voltage.

In another embodiment of the present invention, a substantially continuous low impedance connection between the phase bus and the load is provided through selected combinations of the first, second, third and fourth switches when the AC input voltage is approximately at a nominal level. When the AC input voltage is less than the nominal level, the first and second switches are switched to boost the magnitudes of the first and second DC voltages while providing respective substantially continuous low impedance connections between the load and respective ones of the first and second voltages busses through respective ones of the third and fourth switches during respective positive and negative half-cycles of the AC input voltage. When the AC input voltage is greater than the nominal level, respective substantially continuous low-impedance connections between the AC power source and respective ones the first and second voltage busses are provided through respective ones of the first and second switches during respective positive and negative half-cycles of the AC input voltage, while bucking a voltage generated at the load from the first and second DC voltages.

According to another embodiment of the present invention, fifth and sixth switches that couple and decouple respective ones of the first and second voltage busses and the neutral bus through a third inductor are switched such that the magnitude of the first DC voltage is substantially greater than the magnitude of the second DC voltage during a positive half-cycle of the AC input voltage and such that the magnitude of the second DC voltage is substantially greater than the magnitude of the first DC voltage during a negative half-cycle of the AC input voltage. A battery may be selectively coupled to at least one of the first inductance, the first voltage bus, or the second voltage bus to enable power transfer between the battery and the first and second voltage busses.

DETAILED DESCRIPTION OF PREFERRED EMBODIMENTS

Figure 1:
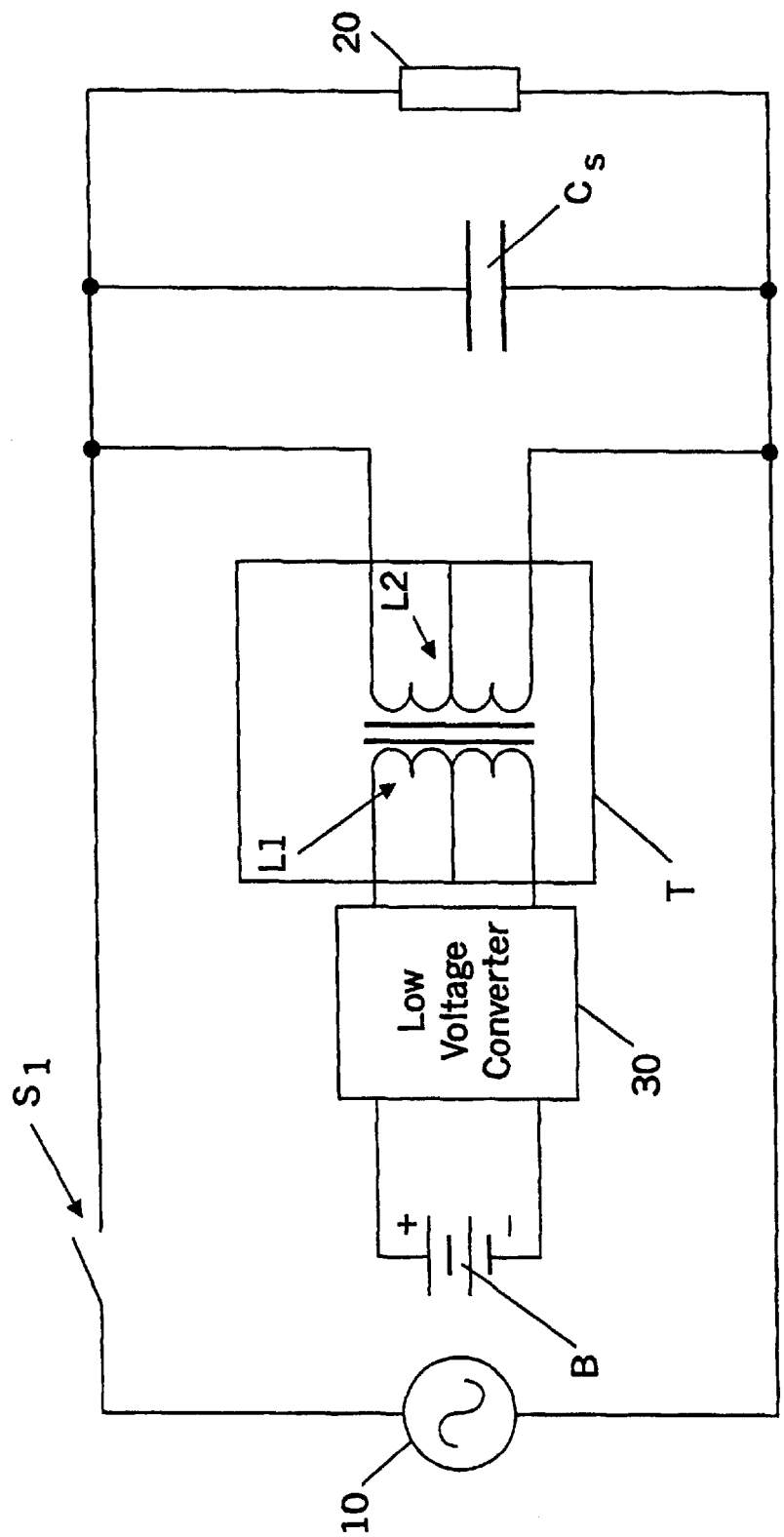
FIGS. 1–3 are schematic diagrams of power conversion circuit topologies used in typical conventional uninterruptible power supplies (UPSs).
Figure 2:
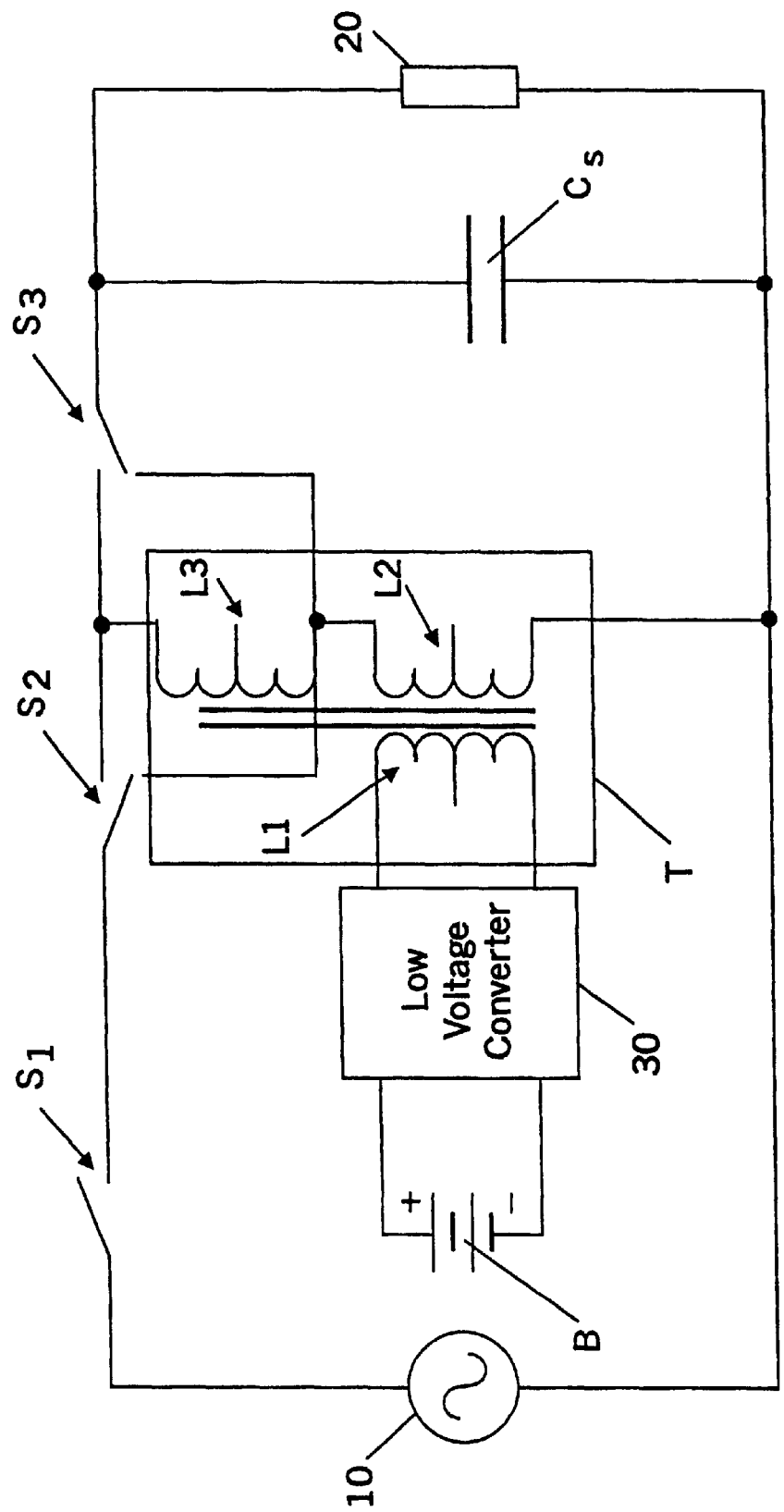
Figure 3:
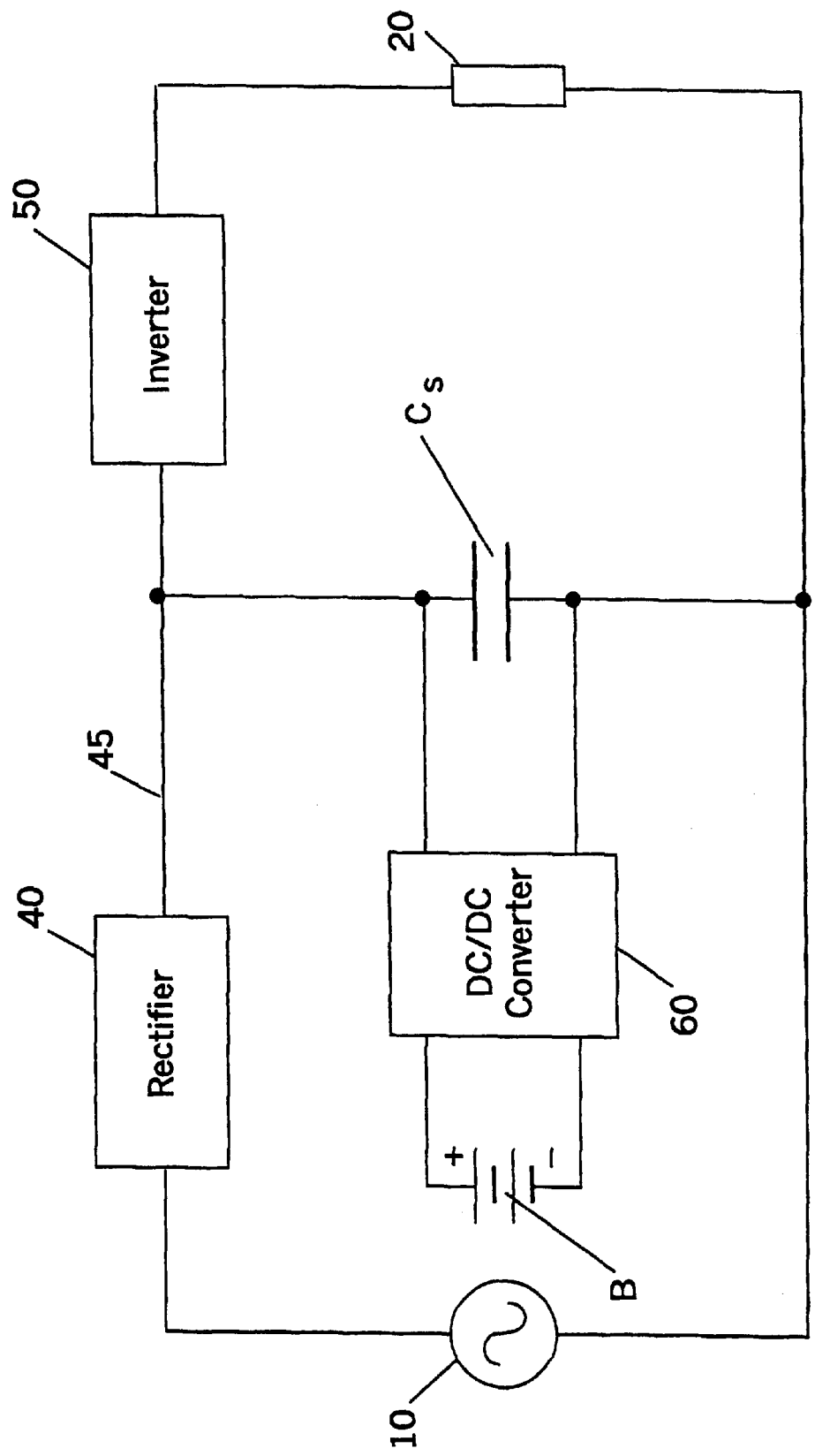

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

Figure 4:
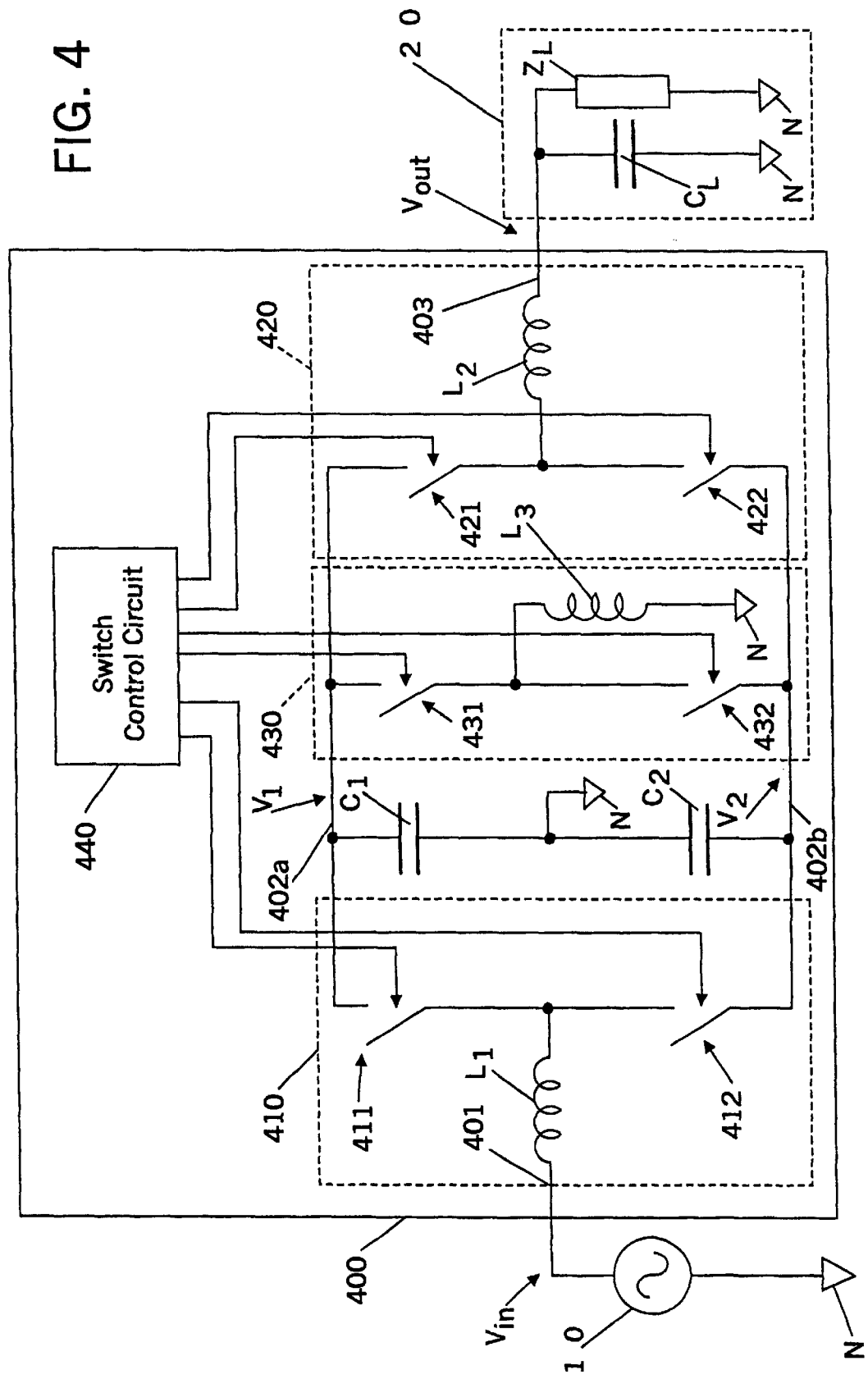
FIGS. 4–5 are schematic diagrams illustrating power converters according to embodiments of the present invention.

FIG. 4 is a schematic diagram illustrating a power converter 400 according to an embodiment of the present invention. The power converter 400 includes a rectifier circuit 410 that is coupled to an AC power source 10, producing first and second DC voltages $V_1$, $V_2$ on respective first and second voltage busses 402a, 402b that are coupled to a neutral bus N by first and second capacitors $C_1$, $C_2$. The rectifier circuit 410 includes first and second switches 411, 412 that selectively couple a phase bus 401 of the AC power source 10 to the first and second power busses 402a, 402b through a first inductor $L_1$, responsive to a switch control circuit 440. The power converter 400 includes an inverter circuit 420 that produces an AC output voltage $V_{out}$ across a load 20 (here shown as including capacitance $C_L$ and generalized impedance $Z_L$) at an output 403 from the first and second DC voltages at the first and second voltage busses 402a, 402b. The inverter circuit includes third and fourth switches 421, 422 that selectively couple the first and second voltage busses 402a, 402b, respectively, to the load 20 through a second inductor $L_2$, responsive to the switch control circuit 440.

The power converter 400 also includes a balancer circuit 430 that is operative to control the relative magnitudes of the first and second DC voltages $V_1$, $V_2$ on the first and second voltage busses 402a, 402b by controlling respective first and second rates (e.g., duty cycles) at which the neutral bus N is connected to respective ones of the first and second voltage busses 402a, 402b through a third inductor $L_3$. As used herein, a "balancer" circuit is a circuit that is capable of effecting a desired "balance" between voltages on different busses, such as the first and second voltage busses 402a, 402b of FIG. 4. As is discussed in greater detail below, this capability can allow power converters according to embodiments of the present invention, among other things, to operate more efficiently and/or to utilize smaller components, e.g., storage capacitors, than those used in many conventional devices. For the illustrated embodiment, this control is achieved by switching fifth and sixth switches 431, 432 responsive to the switch control circuit 440. The switches 431, 432 preferably operate in a substantially complementary fashion (one on and one off at a given time), to constrain the voltages across the capacitors $C_1$, $C_2$. For example, if the switches 431, 432 are each operated at 50% duty cycle, the voltages $V_1$, $V_2$ at the first and second voltage busses 402a, 402b are constrained to be approximately equal.

The inverter circuit 420 can allow current flow from the first and second voltage busses 402a, 402b to the load 20, or vice versa, thus making the inverter circuit 420 a four-quadrant converter. The rectifier circuit 410 preferably has similar characteristics, except that different pulse-width modulation (PWM) patterns preferably are applied to the switches 411, 412 of the rectifier circuit 410 than those applied to the switches 421, 422 of the inverter circuit 420. The PWM patterns employed for the inverter circuit 420 preferably produce a voltage controlled, current limited output voltage, while the PWM patterns employed for the rectifier circuit 410 preferably provide a controlled current to and from the AC power source 10. The rectifier circuit 410 can be operated such that a current is produced that causes power flow into the converter 400 from the AC power source 10, or such that a current is produced that causes power flow into the AC power source 10 from the power converter 400.

Figure 5:
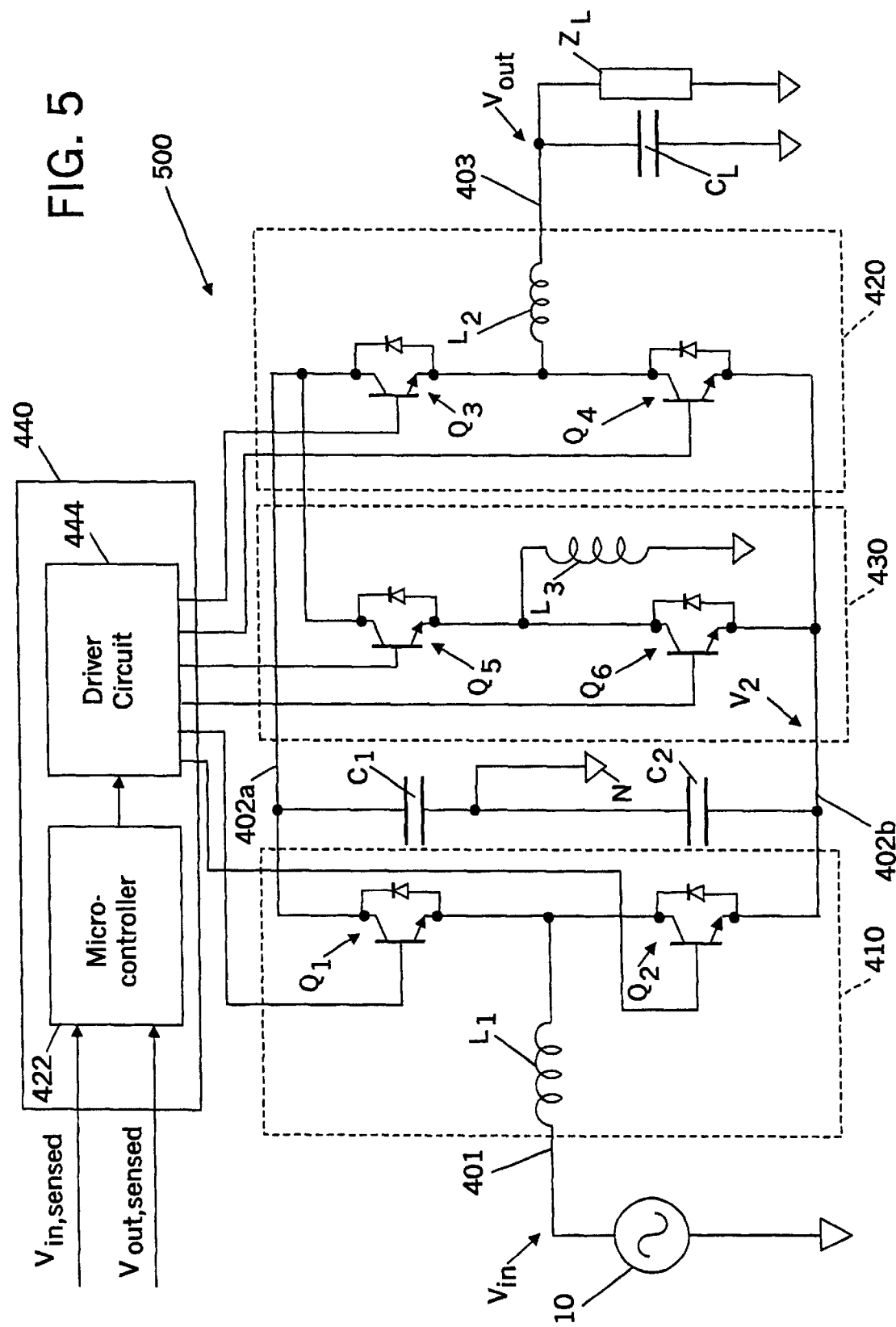

FIG. 5 illustrates a power converter 500 according to another embodiment of the present invention. Portions of the converter 500 of FIG. 5 that are the same as those illustrated in FIG. 4 are denoted with like reference numerals, and further detailed discussion of their operations will not be provided in light of the preceding discussion of FIG. 4. In FIG. 5, diode protected transistor switches $Q_1$, $Q_2$, $Q_3$, $Q_4$, $Q_5$, $Q_6$ are used for the switches 411, 412, 421, 422, 431, 432 of FIG. 4. The transistors $Q_1$, $Q_2$, $Q_3$, $Q_4$, $Q_5$, $Q_6$ operate under control of a switch control circuit 440 that includes a microcontroller 442 and a driver circuit 444. The switch control circuit 440 may control the transistors $Q_1$, $Q_2$, $Q_3$, $Q_4$, $Q_5$, $Q_6$ responsive to sensed AC input voltage $V_{in,sensed}$ and/or sensed AC output voltage $V_{out,sensed}$.

The switch control circuit 440 may operate using different types of control techniques. For example, the switch control circuit 440 may utilize an "open loop" control technique wherein the operations of the transistors $Q_1$, $Q_2$, $Q_3$, $Q_4$, $Q_5$, $Q_6$ are controlled based on a sensed AC input voltage $V_{in,sensed}$, without reference to the output voltage $V_{out}$ produced by the converter 500. The switch control circuit 500 may also operate on a "closed loop" basis, using a sensed AC output voltage $V_{out,sensed}$ to guide control of the operations of the transistors $Q_1$, $Q_2$, $Q_3$, $Q_4$, $Q_5$, $Q_6$. The sensed AC input voltage $V_{in,sensed}$ and sensed AC output voltage $V_{out,sensed}$ may be provided to the switch control circuit 440 in a number of different forms including, but not limited to, analog or digital representations of the input and output voltages $V_{in}$, $V_{out}$, or quantities related to and/or derived from the input and output voltages $V_{in}$, $V_{out}$. If battery-powered or battery-boosted operation is provided, as described below, the switch control circuit 440 may also operate based on a sensed battery voltage (not shown), which may include an analog or digital representation of an actual battery voltage, or a quantity related to and/or derived from such a battery voltage.

It will be appreciated that the embodiment of FIG. 5 represents an exemplary implementation, and that other circuit implementations fall within the scope of the present invention. For example, the switching functions of the transistors $Q_1$, $Q_2$, $Q_3$, $Q_4$, $Q_5$, $Q_6$ may be provided by a variety of switching devices including, but not limited to, bipolar transistors, field-effect transistors (FETs), metal oxide semiconductor FETs (MOSFETs), gate turn-on devices (GTOs), and the like. The driver circuit 444 may include variety of different components as well, and preferably includes components suitable for controlling the particular type(s) of switching devices used.

Other functions of the switching control circuit 440 may be implemented in a number of different ways within the scope of the present invention. For example, functions of the microcontroller 442 may be implemented using discrete logic circuits or programmable logic circuits such as programmable logic devices (PLDs) instead or in conjunction with a microcontroller, microprocessor or similar device. Functions of the microcontroller 442 and the driver circuit 444 may also be combined in one or more devices, such as an application-specific integrated circuit (ASIC) or a hybrid microcircuit.

FIGS. 6–8, 11–12 and 14 are waveform diagrams illustrating exemplary operations of power converters according to embodiments of the present invention. For purposes of the discussion of FIGS. 6–8, 11–12, and 14, operation of the power converters of FIGS. 4, 10 and 13 will be described in terms of the control of the functions of switches 411, 412, 421, 422, 431, 432 of the rectifier, inverter and balancer circuits 410, 420, 430 of the power converter 400 of FIG. 4 (and corresponding devices in the embodiments of FIGS. 5, 9–10, 13 and 15), and more particularly, in terms of the control of "duty cycles" at which the switches are switched (modulated). As used herein, "duty cycle" generally refers to a percentage of time during a switching cycle period (corresponding to the switching frequency described above) that a switch is in a "closed," i.e., conductive, state. Thus, for example, a switch that is maintained at a 50% duty cycle is intermittently "on" for half of a switching cycle, while a switch approaching a 100% duty cycle, e.g., a 99% duty cycle, is on for nearly all of the switching cycle. It will be understood that, as described herein, the switches discussed may also operate at a 100% duty cycle, i.e., be maintained in an "on" state throughout one or more switching cycles, or at a 0% duty cycle, i.e., be maintained in an "off" state throughout one or more switching cycles.

It will be appreciated that this duty cycle control may be achieved, for example, by application of appropriate control signals to appropriate switching components. For example, in the embodiment of FIG. 5, duty cycle control of the switching transistors $Q_1$, $Q_2$, $Q_3$, $Q_4$, $Q_5$, $Q_6$ may be achieved by the microcontroller 442 and driver circuit 444 applying appropriate base drive signals to the switching transistors $Q_1$, $Q_2$, $Q_3$, $Q_4$, $Q_5$, $Q_6$. It will be understood, however, that such duty cycle control may be achieved using any of a number of other switching devices and control signal generating circuits.

Preferably, each of the first, second, third, fourth, fifth and sixth switches 411, 412, 421, 422, 431, 432 of the rectifier, inverter and balancer circuits 410, 420, 430 of FIG. 4, and corresponding components of the embodiments of FIGS. 5, 9–10, 13, and 15, are operated at one or more switching frequencies that are relatively high with respect to the frequency of the AC input voltage $V_{in}$ supplied to the converter 400, more preferably, at one or more switching frequencies that each are at least 10 times higher than the frequency of the AC input voltage $V_{in}$. Using relatively high switching frequencies allows the magnetic components (e.g., the inductors $L_1$, $L_2$, $L_3$) to be relatively small in size. It will be appreciated that although different switching frequencies can be used among the switches 411, 412, 421, 422, 431, 432, a common switching frequency also may be used. Low pass filtering to produce a smoothed output voltage $V_{out}$ may be achieved by the combination of the output inductor $L_2$ and the capacitance $C_L$. It will be appreciated that the output capacitance $C_L$ may be provided by the load 20, as illustrated in FIG. 4, or may be incorporated in the converter 400.

Preferably, the three switch pairs comprising the first and second switches 411, 412, the third and fourth switches 421, 422, and the fifth and sixth switches 431, 432, (and corresponding switching transistor pairs in the embodiments of FIGS. 5, 9–10, 13, and 15) are operated in a "complementary" fashion. Thus, for example, the second switch 412 of FIG. 4 is preferably generally constrained to be "off" when the first switch 411 is "on," and vice versa. However, it will be appreciated that, generally, practical circuit implementations within the scope of the present invention may be used in which the "complementary" switches are operated in an approximately or substantially complementary fashion. For example, a switch pair may be operated in a "break before make" fashion, such that one of the switches in the pair is turned off slightly before the other switch in the pair is turned on. In other circuit implementations, a slight amount of overlap of "on" periods of switches of a complementary pair may be allowed, e.g., a "make before break" mode of operation. Techniques for providing such "make before break" and "break before make" operations are known to those of skill in the art, and will not be discussed in greater detail herein.

Figure 6:
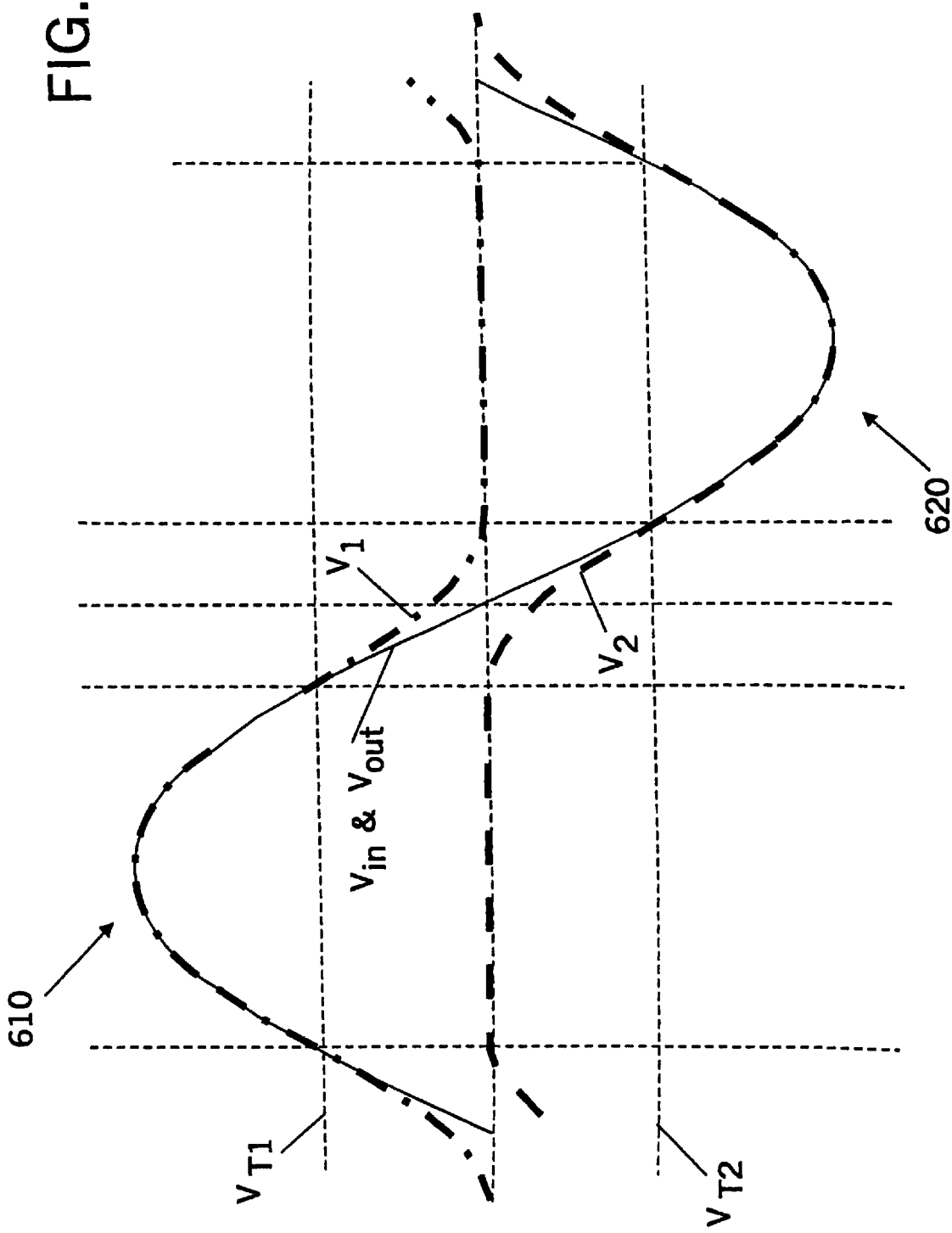
FIGS. 6–8 are waveform diagrams illustrating exemplary operations of a power converter according to the embodiment of FIG. 4.

FIG. 6 illustrates exemplary operations of the converter 400 of FIG. 4 when the input voltage $V_{in}$, is at or near a desired level for the output voltage $V_{out}$. During a positive half-cycle 610 of the input voltage $V_{in}$, the first switch 411 is operated at a duty cycle of approximately 100% (i.e., approaching a steady state "closed" state), while the second switch 412 is operated a complementary duty cycle of approximately 0% (i.e., approaching a steady state "open" state). The third switch 421 and the fourth switch 422 also operate at complementary duty cycles of approximately 100% and approximately 0%, respectively. Thus, a substantially continuous low impedance connection is provided between the input node 401 and the load 20 at the output node 403 via the first voltage bus 402a. As a result, the first DC voltage $V_1$ and the output voltage $V_{out}$ essentially track the input voltage $V_{in}$. Although the balancer circuit 430 can be left in an inactive state, i.e., both the fifth and sixth switches can be left in an "off" state, the fifth switch 431 preferably is operated at a duty cycle of approximately 0% until the first DC voltage $V_1$ falls below a first threshold voltage $V_{T1}$ while the sixth switch 432 is operated at a complementary duty cycle of approximately 100%.

During the negative half-cycle 620 of the input voltage $V_{in}$, the duty cycles of the first, second, third and fourth switches 411, 412, 421, 422 are changed. The first and second switches 411, 412 are operated at complementary duty cycles of approximately 0% and approximately 100%, respectively, while the third and fourth switches 431, 432 operate at complementary duty cycles of approximately 0% and approximately 100%, respectively. This provides a substantially continuous low-impedance connection between the input node 401 and the output node 403 via the second voltage bus 402b, such that the second DC voltage $V_2$ and the output voltage $V_{out}$ essentially track the input voltage $V_{in}$. As with the positive half-cycle, although the balancer circuit 430 can be left inactive, the fifth switch 431 preferably is operated at a duty cycle of approximately 100% while the second DC voltage $V_2$ is less than second threshold voltage $V_{T2}$, with the sixth switch 432 being operating at a complementary duty cycle of approximately 0%.

The switches 431, 432 in the balancer circuit 430 can be used to smooth transition of the output voltage $V_{out}$ near zero volts, by varying the duty cycles of these switches between the threshold voltages $V_{T1}$, $V_{T2}$. As the first DC voltage $V_1$ falls below the first threshold voltage $V_{T1}$ during the positive half-cycle 620, the balancer circuit 430 begins to increase the duty cycle of the fifth switch 431 while decreasing the duty cycle of the sixth switch 432 in a complementary fashion, thus driving the second DC voltage $V_2$ negative before the actual zero crossing of the input voltage $V_{in}$. The duty cycles of the fifth and sixth switches 431, 432 are increased and decreased, respectively, such that by the time the second DC voltage $V_2$ becomes more negative than the second threshold voltage $V_{T2}$, the fifth and sixth switches are switching at duty cycles of approximately 100% and approximately 0%, respectively. This anticipatory generation of the second DC voltage $V_2$ allows the inverter circuit 420 to be switched such that a relatively smooth transition of the output voltage $V_{out}$ through zero volts can be achieved.

Similar zero-crossing control can be achieved as the AC input voltage $V_{in}$ approaches zero volts during the negative half cycle 620 by varying the duty cycles of the fifth and sixth switches 431, 432 in a complementary manner. As the second DC voltage $V_2$ increases above the second threshold voltage $V_{T2}$, the duty cycle of the fifth switch 431 is decreased while the duty cycle of the sixth switch 432 is increased, driving the first DC voltage $V_1$ in a positive direction before the zero crossing of the input voltage $V_{in}$. The duty cycles of the fifth and sixth switches 431, 432 are decreased and increased, respectively, such that by the time the first DC voltage $V_1$ exceeds the first threshold voltage $V_{T1}$, the fifth and sixth switches 431, 432 are switching at complementary duty cycles of approximately 0% and approximately 100%, respectively.

Figure 7:
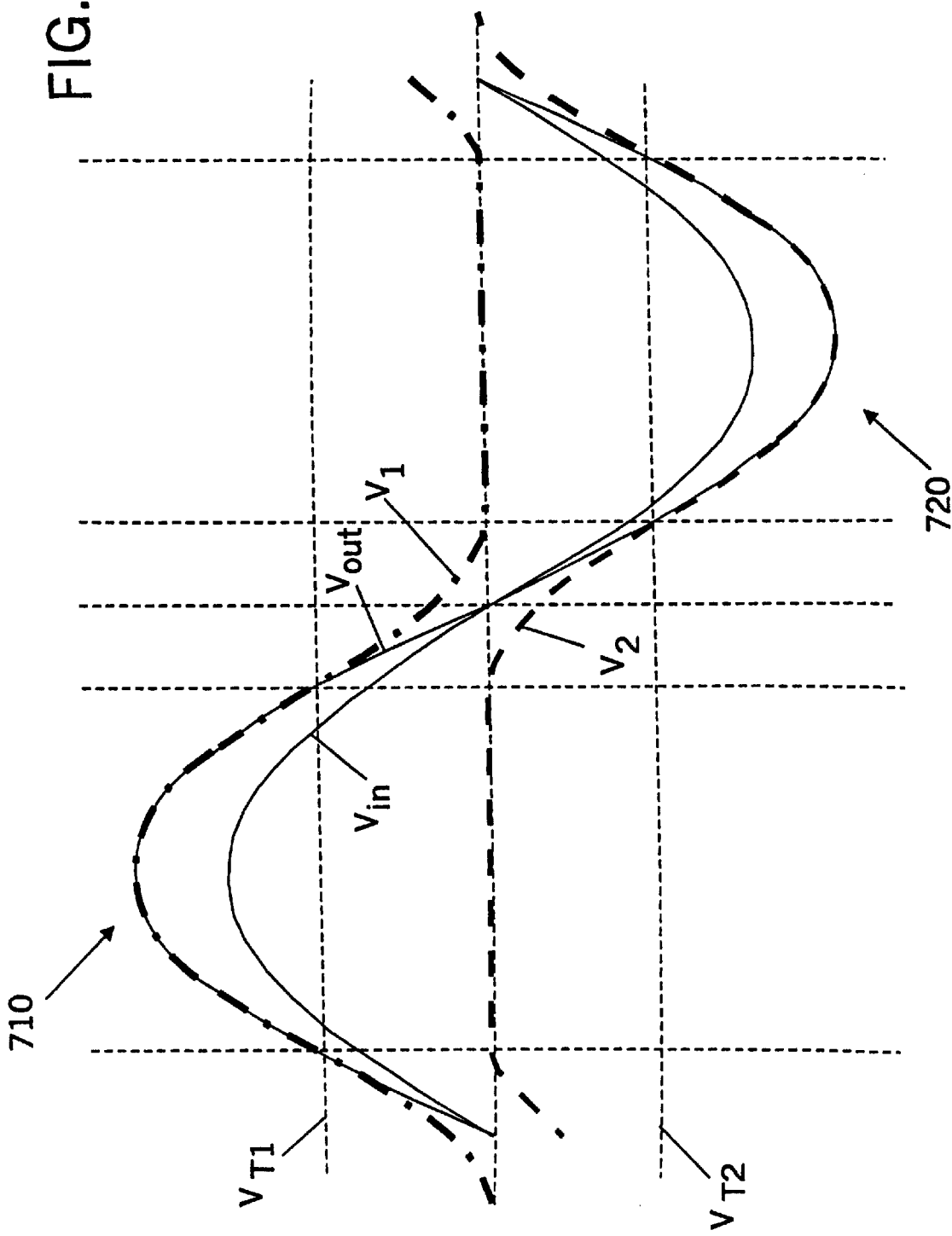

FIG. 7 illustrates exemplary operations of the converter 400 of FIG. 4 when the input voltage $V_{in}$ falls below a desired level for the output voltage $V_{out}$. During a positive half-cycle 710 of the input voltage $V_{in}$, the first and second switches 411, 412 are operated at complementary duty cycles sufficiently less than 100% and sufficiently greater than 0%, respectively, such that the action of the switches 411, 412 and the first inductor $L_1$ boosts the first DC voltage $V_1$ above the input voltage $V_{in}$. The third switch 421 and the fourth switch 422 operate at complementary duty cycles of approximately 100% and approximately 0%, respectively, providing a substantially continuous low-impedance connection between the first voltage bus 402a and the output node 403. While the first DC voltage $V_1$ is above a first threshold voltage $V_{T1}$, the fifth and sixth switches 431, 432 of the balancer circuit 430 are operated at complementary duty cycles of approximately 0% and approximately 100%, respectively. However, when the first DC voltage $V_1$ falls below the first threshold voltage $V_{T1}$, the duty cycles of the fifth and sixth switches 431, 432 of the balancer circuit 430 can be increased and decreased, respectively, while the third and fourth switches 421, 422 of the inverter 420 are modulated to produce a smoothed zero crossing for the output voltage $V_{out}$.

During the negative half-cycle 720 of the input voltage $V_{in}$, the duty cycles of the first, second, third and fourth switches 411, 412, 421, 422 are changed. The first and second switches 411, 412 are operated at complementary duty cycles sufficiently greater than 0% and sufficiently less than 100%, respectively, such that action of the first and second switches 411, 412 and the first inductor $L_1$ drive the second DC voltage $V_2$ more negative than the input voltage $V_{in}$. The third and fourth switches 421, 422 operate at complementary duty cycles of approximately 0% and approximately 100%, respectively, providing a substantially continuous low-impedance connection between the second voltage bus 402b and the output node 403. While the second DC voltage $V_2$ is less than the second threshold voltage $V_{T2}$, the fifth and sixth switches 431, 432 of the balancer circuit 430 are operated at complementary duty cycles of approximately 100% and approximately 0%, respectively, allowing the output voltage $V_{out}$ to essentially track the second DC voltage $V_2$. However, when the second DC voltage $V_2$ exceeds the second threshold voltage $V_{T2}$ the duty cycles of the fifth and sixth switches 431, 432 of the balancer circuit 430 may be decreased and increased, respectively, while the third and fourth switches 421, 422 of the inverter 420 are modulated to produce a smoothed zero crossing for the output voltage $V_{out}$.

Figure 8:
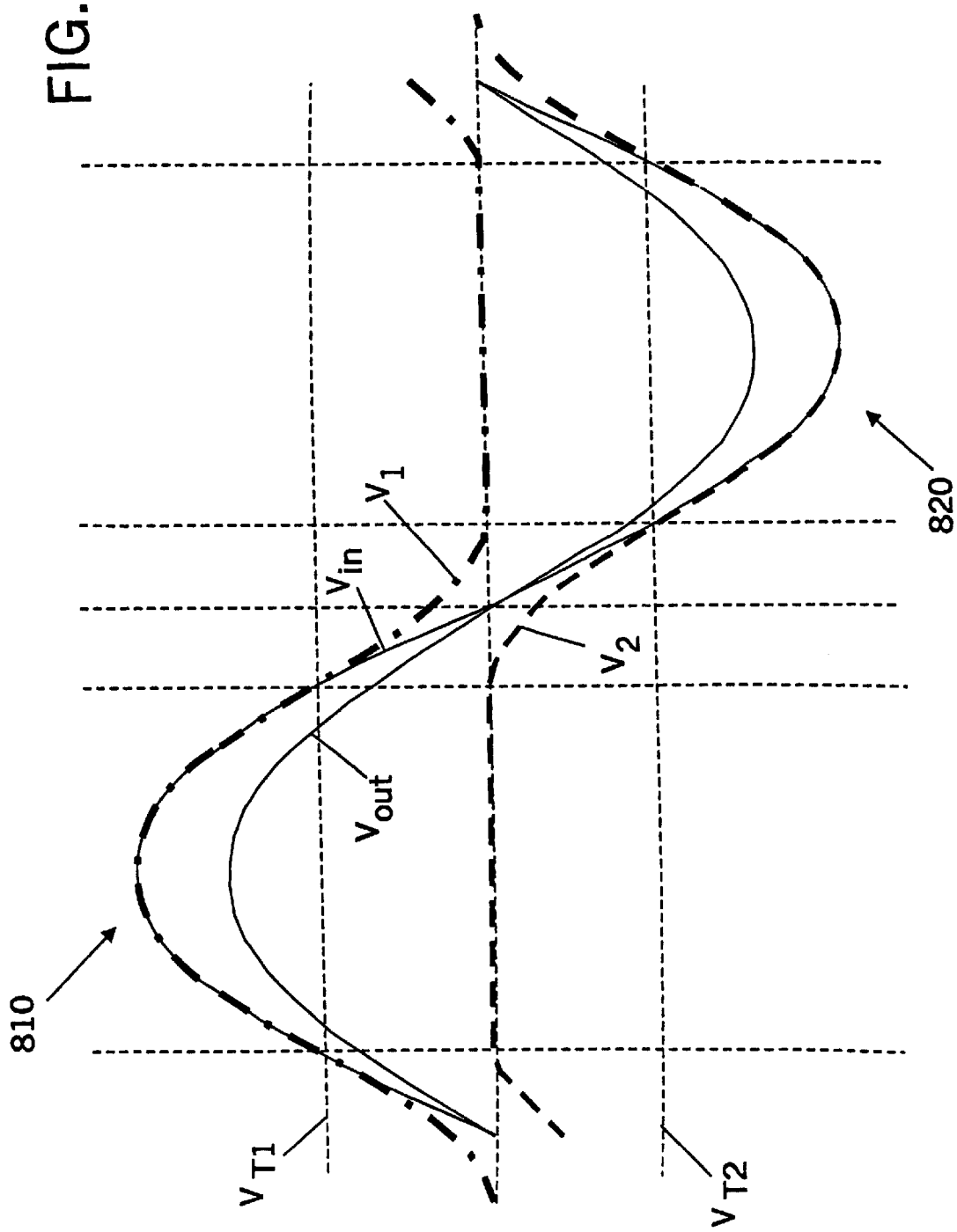

FIG. 8 illustrates exemplary operations of the converter 400 of FIG. 4 when the input voltage $V_{in}$ exceeds a desired level for the output voltage $V_{out}$. During a positive half-cycle 810 of the input voltage $V_{in}$, the first switch 411 is operated at a duty cycle of approximately 100%, while the second switch 412 is operated at a complementary duty cycle of approximately 0%, thus providing a substantially continuous low impedance connection between the input node 401 to the first voltage bus 402a. The third and fourth switches 421, 422 are switched at complementary duty cycles sufficiently less than 100% and sufficiently greater than 0%, respectively, such the action of the third and fourth switches 421, 422 and the second inductor $L_2$ reduce the magnitude of the output voltage $V_{out}$ applied to the load 20. While the first DC voltage $V_1$ is above a first threshold voltage $V_{T1}$, the fifth and sixth switches 431, 432 of the balancer circuit 430 are preferably operated at complementary duty cycles of approximately 0% and approximately 100%, respectively, which can provide an advantageous energy transfer between the capacitors $C_1$, $C_2$, as described above. However, when the first DC voltage $V_1$ falls below the first threshold voltage $V_{T1}$, the duty cycles of the fifth and sixth switches of the balancer circuit 430 can be increased and decreased, respectively, while the third and fourth switches 421, 422 of the inverter 420 are modulated to produce a smoothed zero crossing for the output voltage $V_{out}$.

During the negative half-cycle 820 of the input voltage $V_{in}$, the duty cycles of the first, second, third, and fourth switches 411, 412, 421, 422 are changed. The first and second switches 411, 412 operate at complementary duty cycles of approximately 0% and approximately 100%, respectively, thus providing a substantially continuous low impedance connection between the input node 401 and the second voltage bus 402b. The third and fourth switches 421, 422 are operated at complementary duty cycles sufficiently greater than 0% and sufficiently less than 100%, respectively, such that the action of the switches 421, 422 and the second inductor $L_2$ decrease the magnitude of the output voltage $V_{out}$ applied to the load 20. While the second DC voltage $V_2$ is below the second threshold voltage $V_{T1}$, the fifth and sixth switches 431, 432 of the balancer circuit 430 are operated at complementary duty cycles of approximately 100% and approximately 0%, respectively. However, when the second DC voltage $V_2$ exceeds the second threshold voltage $V_{T2}$, the duty cycles of the fifth and sixth switches of the balancer circuit 430 can be decreased and increased, respectively, while he third and fourth switches 421, 422 of the inverter 420 are modulated to produce a smoothed zero crossing for the output voltage $V_{out}$.

Figure 9:
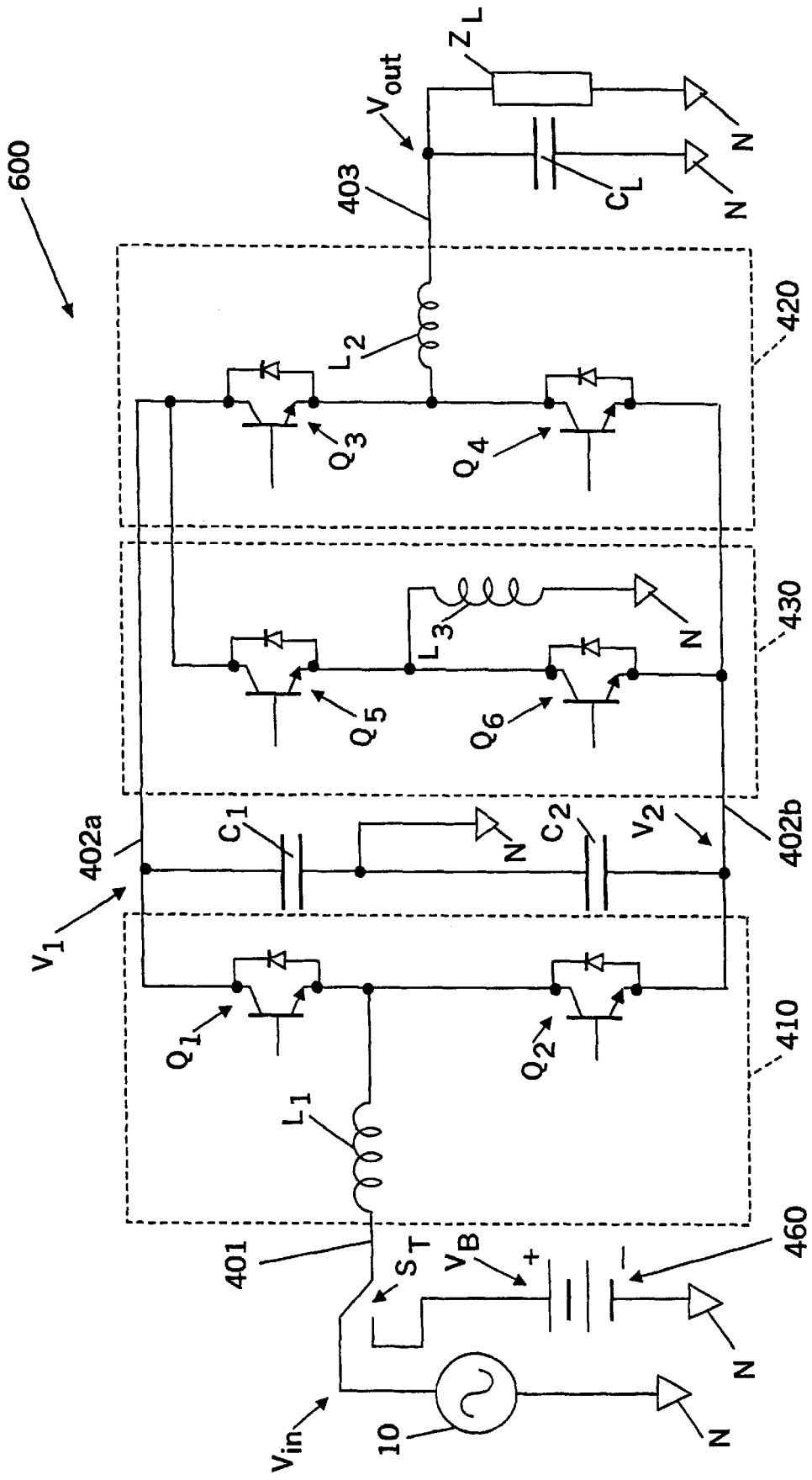
FIGS. 9–10 are schematic diagrams illustrating power converters according to other embodiments of the present invention.

FIG. 9 illustrates a power converter 600 according to another embodiment of the present invention, in which a secondary power source, e.g., a battery 460, may be provided to generate the output voltage $V_{out}$ when the AC power source 10 fails. As shown, either the AC power source 10 or the battery 460 is connected to the input inductor $L_1$ by a transfer switch $S_T$. Techniques for controlling operation of such a transfer switch are known to those skilled in the art, and will not be discussed in greater detail herein.

When the transfer switch $S_T$ is in a state such that the battery 460 is connected to the inductor $L_1$, i.e., when the converter 600 is operating off of DC power provided by the battery 460, the rectifier circuit 410 is operated as a battery boost circuit. To generate a positive half-cycle of a desired sinusoidal output voltage $V_{out}$, the first transistor $Q_1$ is first switched at a duty cycle of approximately 100% and the second transistor $Q_2$ is switched at a complementary duty cycle of approximately 0%, when the battery voltage $V_B$ is greater than the desired output voltage $V_{out}$. The balancer circuit 430 can be left inactive, but preferably is operated such that the fifth transistor $Q_5$ is switched at a duty cycle of approximately 0% while the sixth transistor $Q_6$ is switched at a complementary duty cycle of approximately 100%. The duty cycles of the transistors $Q_3$, $Q_4$ of the inverter 420 are varied such that the voltage $V_1$ at the first voltage bus 402a is bucked to produce the desired output voltage $V_{out}$.

Once the desired output voltage $V_{out}$ is greater than the battery voltage $V_B$, however, the duty cycles of the first and second transistors $Q_1$, $Q_2$ of the rectifier circuit 410 are varied to provide an appropriate boost to the voltage $V_1$ at the first voltage bus 402a needed to track the desired output voltage $V_{out}$. The duty cycles of the transistors $Q_5$, $Q_6$ of the balancer circuit 430 are changed to operate at duty cycles of approximately 0% and approximately 100%, respectively. The transistors $Q_3$, $Q_4$ of the inverter circuit 420 are operated at complementary duty cycles of approximately 100% and approximately 0%, respectively.

When the desired output voltage $V_{out}$ is again less than the battery voltage $V_B$ (towards the end of the positive half-cycle), the rectifier transistors $Q_1$, $Q_2$ are operated again at complementary duty cycles of approximately 100% and approximately 0%, respectively. The balancer circuit 430 can be left inactive, but preferably is operated such that the fifth transistor $Q_5$ is switched at a duty cycle of approximately 0% and the sixth transistor $Q_6$ is switched at a complementary duty cycle of approximately 100%. The transistors $Q_3$, $Q_4$ of the inverter 420 are switched such that the voltage $V_1$ at the first voltage bus 402a is bucked to provide the desired output voltage $V_{out}$.

To generate the negative half-cycle of the desired output voltage $V_{out}$, the transistors $Q_1$, $Q_2$ of the rectifier 410 are operated at complementary duty cycles of approximately 100% and approximately 0%, respectively, making the voltage $V_1$ at the first voltage bus 402a approximately the same as the battery voltage $V_B$. The duty cycles of the transistors $Q_5$, $Q_6$ of the balancer circuit 430 are varied such that the voltage $V_2$ at the second voltage bus 402b approximately tracks the desired output voltage $V_{out}$. The transistors $Q_3$, $Q_4$ of the inverter 420 are operated at duty cycles of approximately 0% and approximately 100%, respectively, as the voltage $V_2$ at the second voltage bus 402b is approximately the desired output voltage $V_{out}$.

It will be appreciated that the above-described operations can be used to generate a wider variety of output voltage waveforms. For example, by appropriately modulating the switching elements of the rectifier and balancer circuits 410, 430, the power converter 600 of FIG. 9 can produce sinusoidal, quasi-sinusoidal, square wave, quasi-square wave and a variety of other output waveforms.

Figure 10:
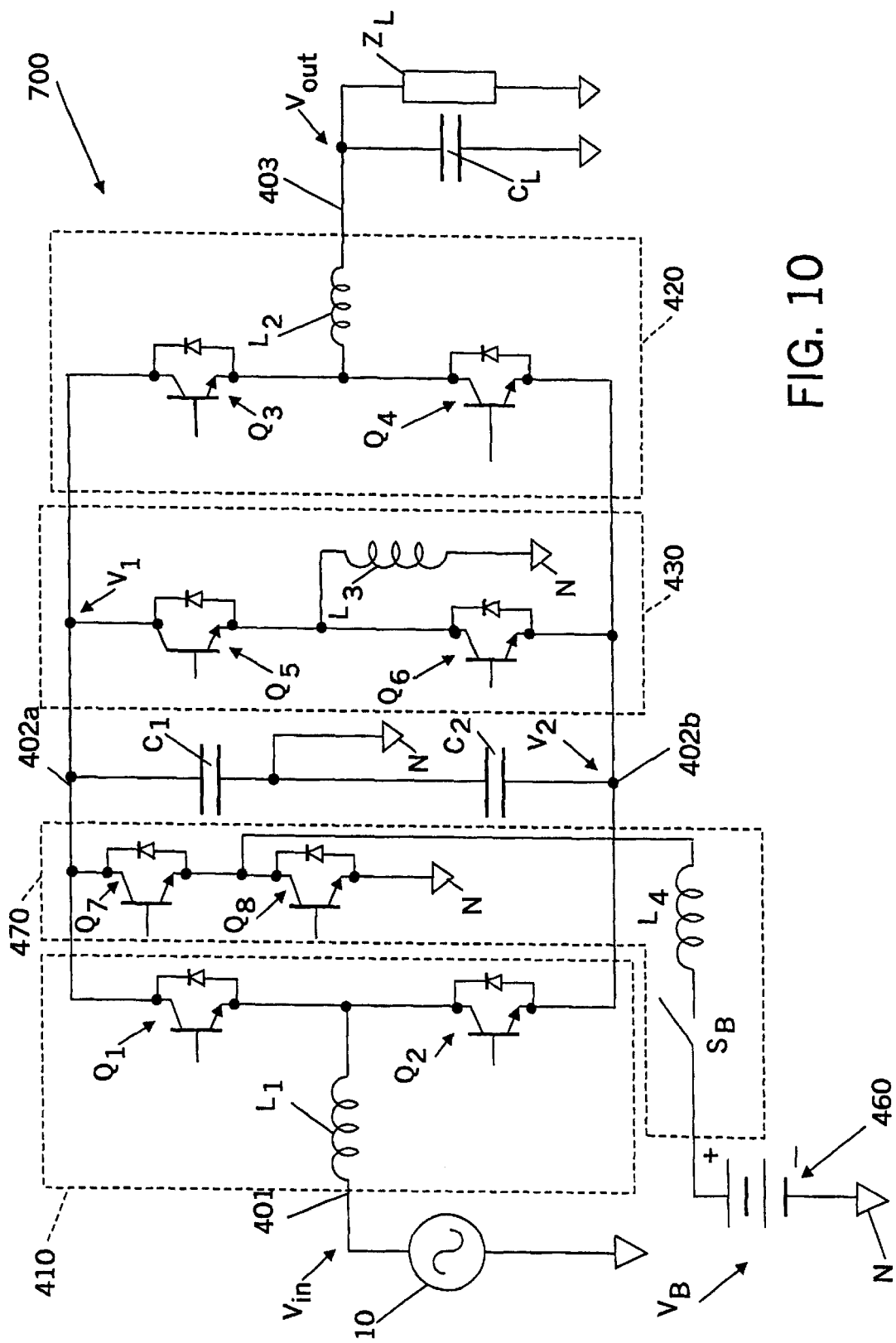

FIG. 10 illustrates a power converter 700 according to another embodiment of the present invention, which resembles the embodiment of FIG. 5 with the addition of a battery coupling circuit 470 including seventh and eight switching transistors $Q_7$, $Q_8$ that selectively couple a battery 460 to the first voltage bus 402a and the neutral bus N via a switch $S_B$ and an inductor $L_4$. The switch $S_B$, which may be a mechanical or other switching device, is not required, but can reduce energy losses if opened when the battery 460 does not require charging.

When the switch $S_B$ is closed, the first DC voltage $V_1$ preferably is controlled such that it never falls below the battery voltage $V_B$. The switching actions of the first and second switching transistors $Q_1$, $Q_2$ of the rectifier circuit 410 and/or the fifth and sixth switching transistors $Q_5$, $Q_6$ of the balancer circuit 430 can control the first DC voltage $V_1$. When the first DC voltage $V_1$ exceeds the battery voltage $V_B$, the seventh switching transistor $Q_7$ can be modulated (switched) to produce a current that charges the battery 460.

Figure 11:
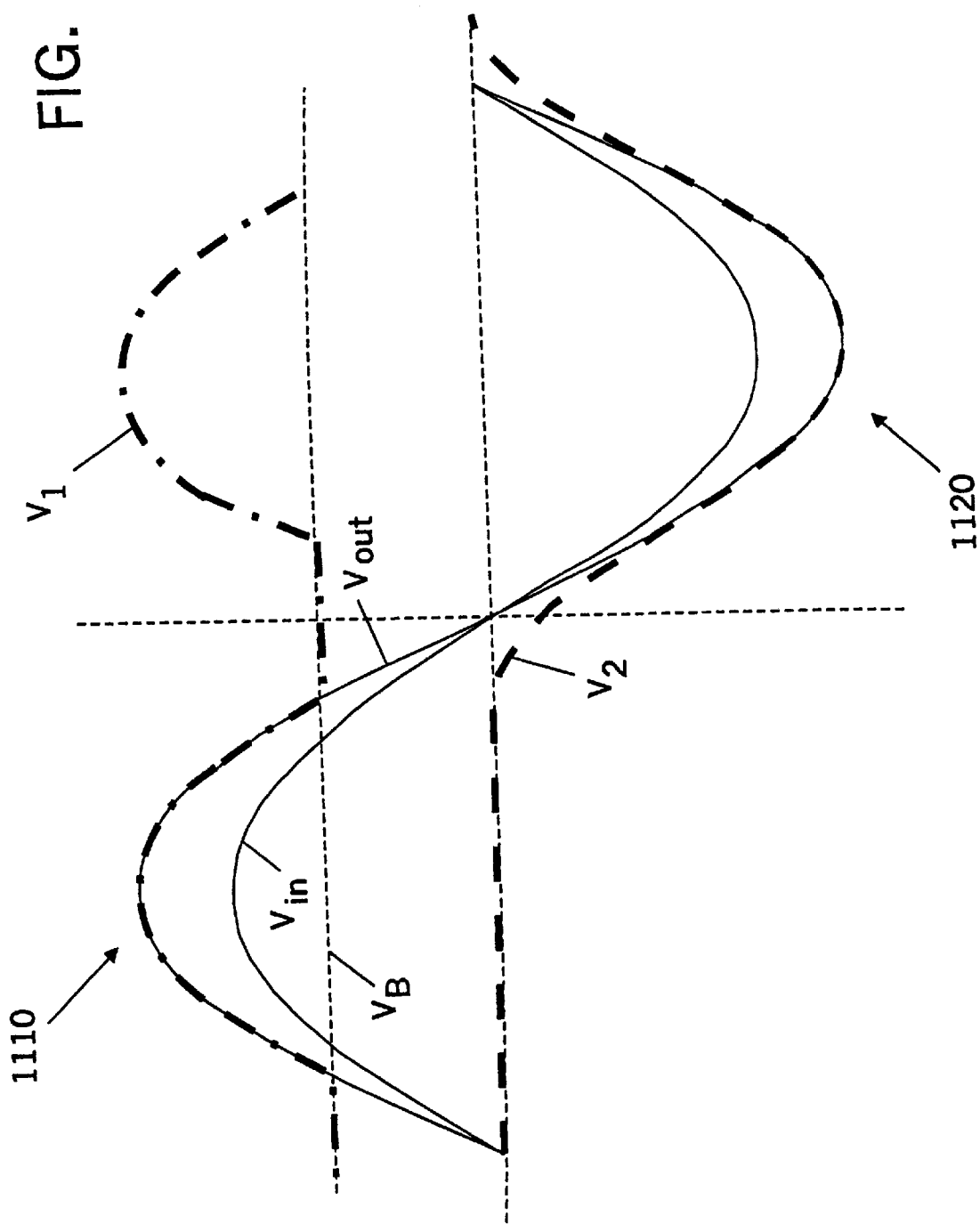
FIGS. 11–12 are waveform diagrams illustrating exemplary operations for a power converter of FIG. 10.

FIG. 11 is a waveform diagram illustrating exemplary operations for the embodiment of FIG. 10 when the battery 460 is charging. For a portion of a positive half-cycle 1110 of the input voltage $V_{in}$ when the first DC voltage $V_1$ is greater than the battery voltage $V_B$, the seventh and eighth switching transistors $Q_7$, $Q_8$ are switched to allow current to flow from the first voltage bus 402a to the battery 460. During a negative half-cycle 1120, the fifth and sixth switching transistors $Q_5$, $Q_6$ of the balancer circuit 430 are each operated at 50% duty cycles for the time the magnitude of the input voltage $V_{in}$ is greater than the battery voltage $V_B$. This keeps the first DC voltage $V_1$ significantly greater than the battery voltage $V_B$ during this period, allowing the seventh and eighth transistors $Q_7$, $Q_8$ to be switched to provide current flow into the battery 460 from the first voltage bus 402a. In this manner, the current drawn from the AC source 10 for the positive and negative half-cycles 1110, 1120 of the input voltage $V_{in}$ can be kept substantially symmetrical.

Figure 12:
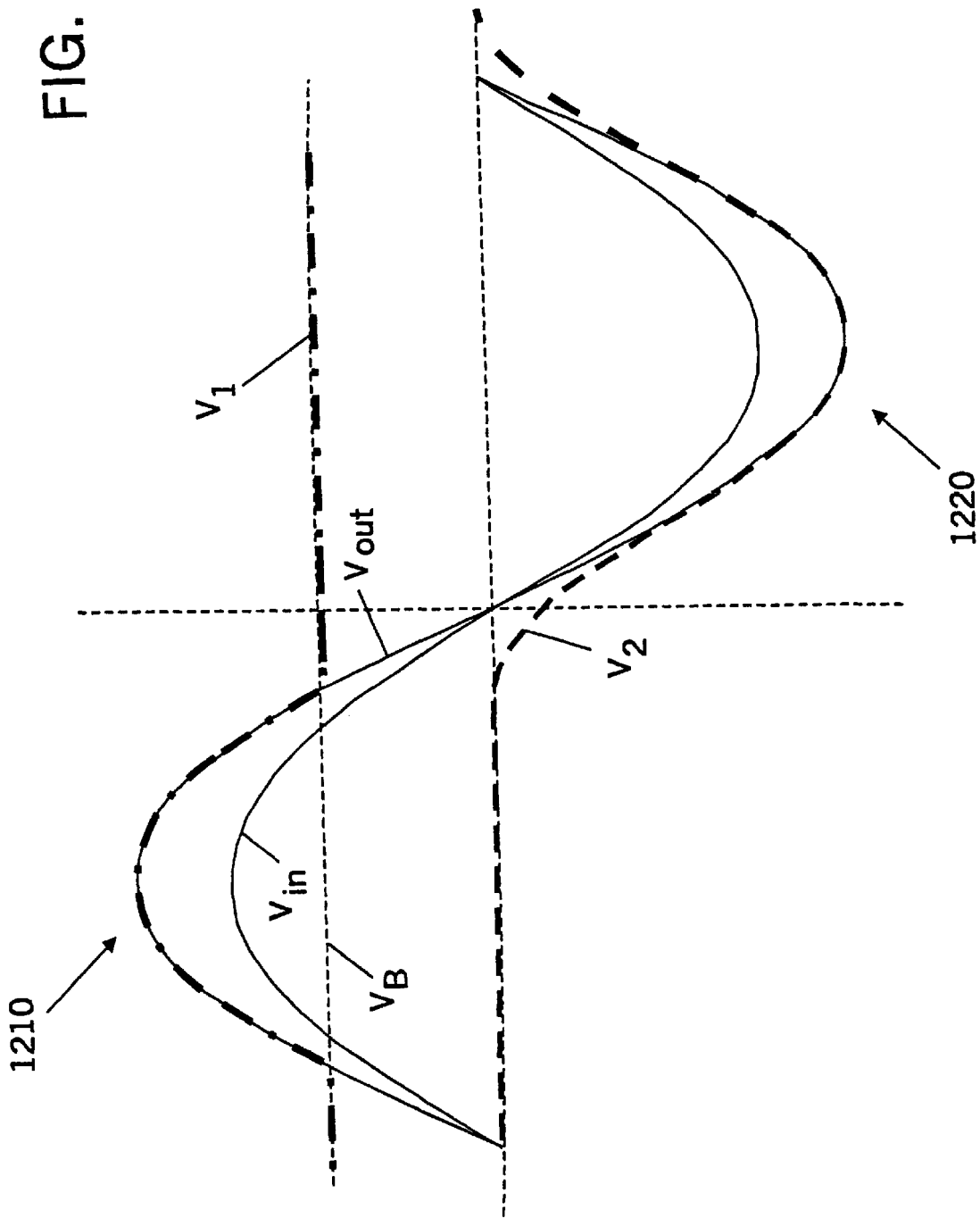

Referring to FIG. 12, when the battery 460 does not need charging, the seventh and eighth transistors $Q_7$, $Q_8$ can be operated such that current does not flow between the battery 460 and the first voltage bus 402a during a positive half-cycle 1210 of the input voltage $V_{in}$. If the switch $S_B$ remains open, the operations of the balancer circuit 430 during the negative half-cycle 1220 of the input voltage $V_{in}$ can be changed from the operations described above with reference to FIG. 10 to provide more efficient operation while maintaining the first DC voltage $V_1$ at or above the battery voltage $V_B$ and prevent current flow therebetween. If the switch $S_B$ is opened, further improvement in efficiency can be gained, as the first DC voltage $V_1$ need no longer be constrained to be greater than or equal to the battery voltage $V_B$.

Figure 13:
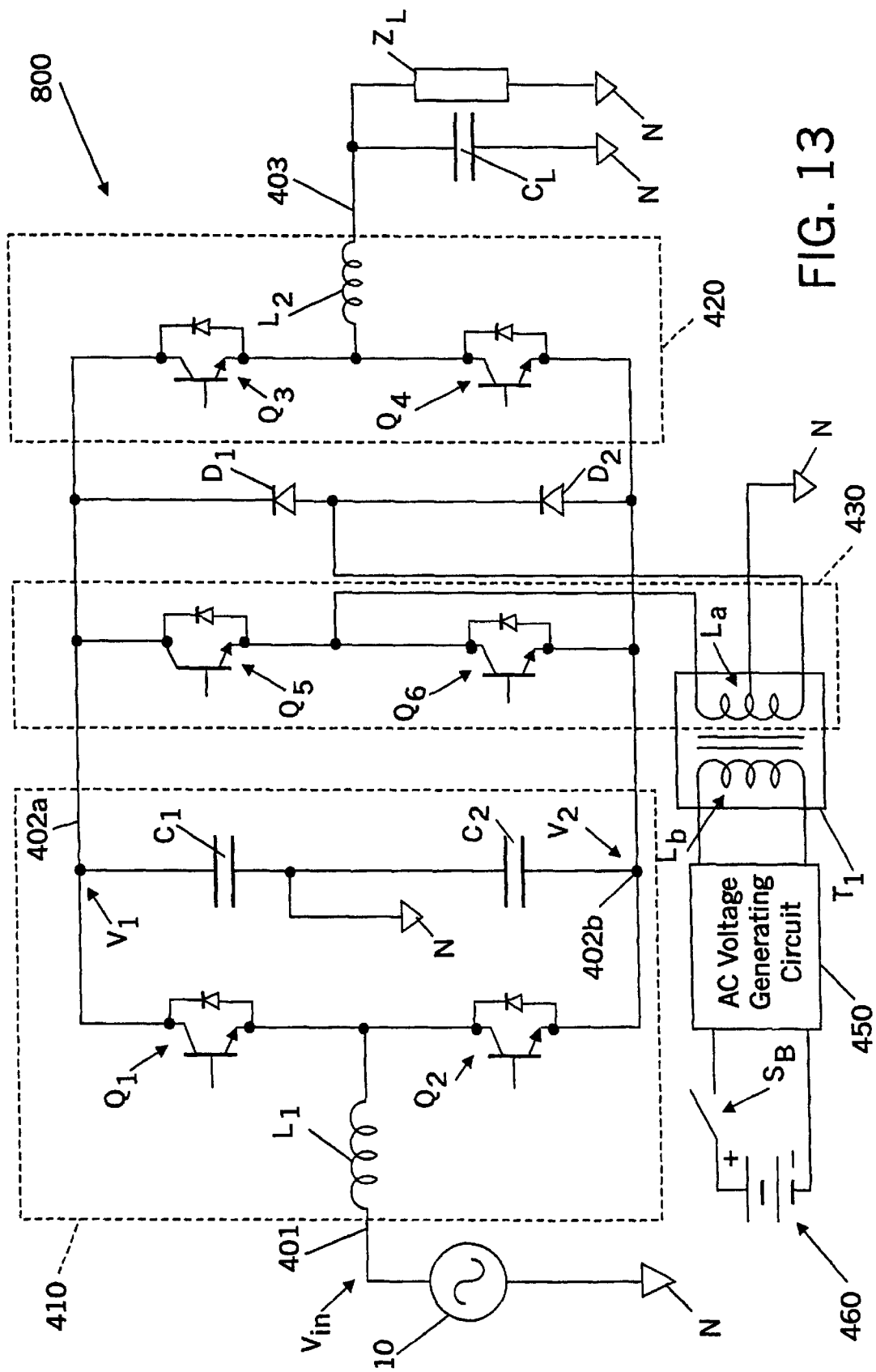
FIG. 13 is a schematic diagram illustrating a power converter according to another embodiment of the present invention.

FIG. 13 illustrates a power converter 800 according to yet another embodiment of the present invention, wherein the inductance through which the fifth and sixth switching transistors $Q_5$, $Q_6$ couple the neutral bus N to the first and second voltage busses 402a, 402b is provided by a first winding $L_a$ of a transformer $T_1$. Specifically, the fifth and sixth switching transistors $Q_5$, $Q_6$ selectively couple the first and second voltage busses 402a, 402b to a first end tap of the winding $L_a$, a center tap of the winding $L_a$ being coupled to the neutral bus N. A second end tap of the winding $L_a$ is coupled to a node between a serial-connected pair of diodes $D_1$, $D_2$ coupled between the first and second voltage busses 402a, 402b.

According to another aspect of the present invention also illustrated by the embodiment of FIG. 13, a secondary power source, here a battery 460, may be coupled to a second winding $L_b$ of the transformer $T_1$ via a switch $S_B$ and an AC voltage generating circuit 450 (e.g. a battery converter circuit). In a battery-powered or battery-boosted mode, the switch $S_B$ is closed and the AC voltage generating circuit 450 produces an AC voltage (e.g., a square wave, quasi-square wave, sine wave, quasi sine wave, or other periodic or quasi-periodic voltage) across the second winding $L_b$ from a DC voltage produced by the battery 460. This induces a corresponding AC voltage across the first winding $L_a$. Under appropriate control of a switch control circuit (such as the switch control circuit 440 of FIG. 5), the fifth and sixth transistors $Q_5$, $Q_6$, in conjunction with the diodes $D_1$, $D_2$, produce DC voltages $V_1$, $V_2$ on the first and second voltage busses 402a, 402b from the AC voltage induced across the first winding $L_a$. These DC voltages $V_1$, $V_2$ may be inverted by the inverter 420 to produce an AC voltage at the output bus 403. The battery 460 may be decoupled by opening the switch $S_B$, as might be done when the converter 800 is operated as an off-line UPS.

In embodiments according to the present invention, the AC voltage generating circuit 450 may act as a combined battery converter/battery charger circuit. In a battery charging mode, the AC voltage generating circuit 450 may act as a rectifier, producing a DC voltage across the battery 460 from an AC voltage induced on the second winding $L_b$, thus allowing the battery 460 to be charged. An exemplary implementation for such dual purpose AC voltage generating circuit 450 is described with reference to FIG. 15, below.

Figure 14:
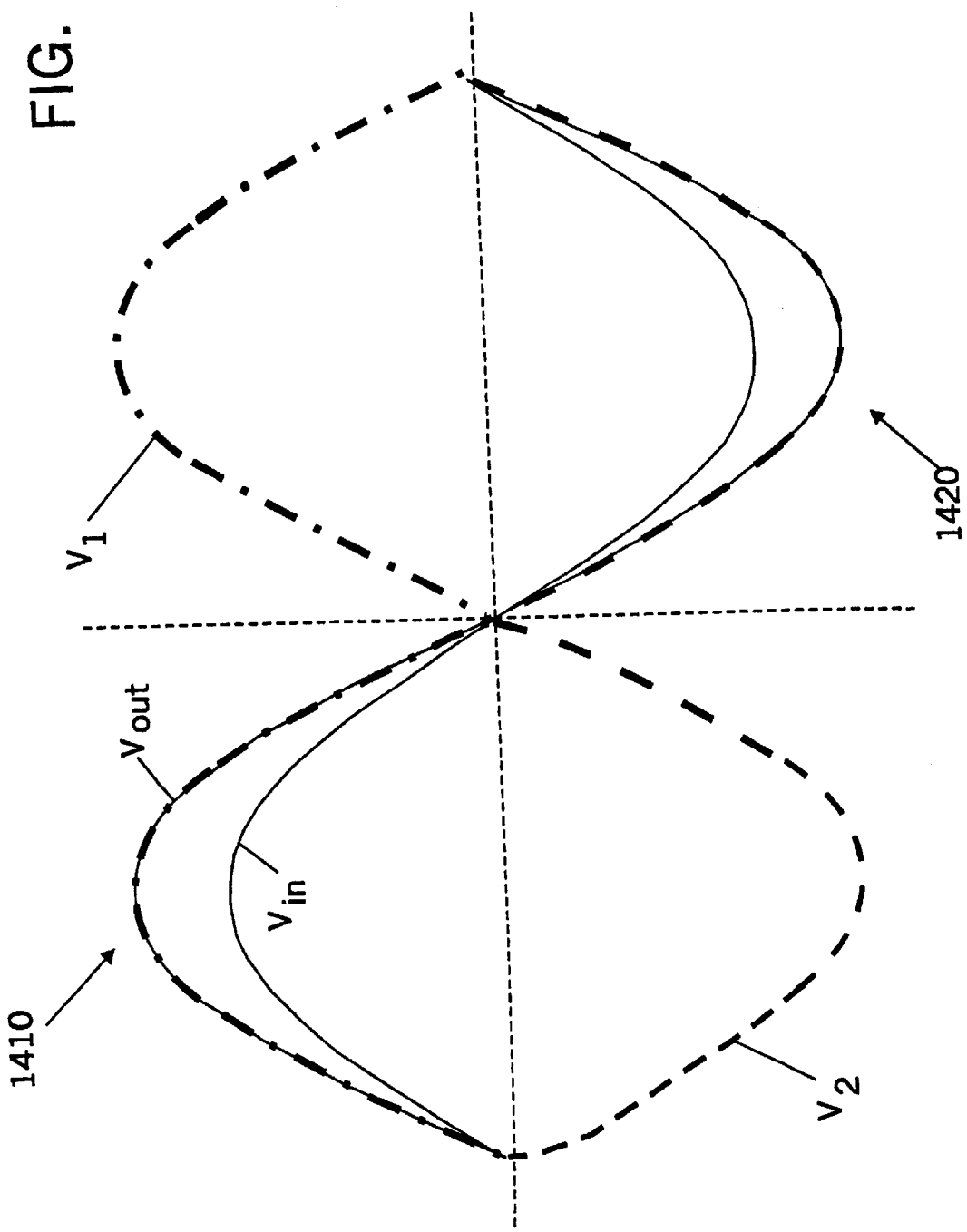
FIG. 14 is a waveform diagram illustrating exemplary operations for a power converter of FIG. 12.

FIG. 14 is waveform diagram illustrating exemplary operations for the converter 800 of FIG. 13 for a case in which the input voltage $V_{in}$ is boosted to produce a desired output voltage $V_{out}$. Here, the fifth and sixth switching transistors $Q_5$, $Q_6$ are preferably both operated at 50% duty cycles in both positive and negative half-cycles 1410, 1420 of the input voltage $V_{in}$. As a result, the first and second DC voltages $V_1$, $V_2$ are constrained to have substantially equal magnitudes.

The operations of FIG. 14 illustrate another advantageous aspect of the balancer circuit 430. Operating the fifth and sixth transistors $Q_5$, $Q_6$ at 50% duty cycles can provide energy transfer from the second capacitor $C_2$ to the first capacitor $C_1$ during the positive half-cycle 1410 of the input voltage $V_{in}$ helping maintain the first DC voltage $V_1$ when the load draws current. A similar energy transfer from the first capacitor $C_1$ to the second capacitor $C_2$ can be provided during the negative half-cycle 1420 of the input voltage $V_{in}$. This ability to transfer energy allows the capacitors $C_1$, $C_2$ to have a relatively low capacitance for a given power rating in comparison to storage capacitors used in many conventional converter designs.

In particular, the energy transfer described above allows each of the capacitors $C_1$, $C_2$ to have a "per unit" capacitance of less than 1. Per unit capacitance may be described as follows. If nominal AC voltage is applied across one of the capacitors $C_1$, $C_2$, the capacitor would draw an AC current proportional to its capacitance. If this current is equal to a full load AC current for the power converter 400 at the nominal AC voltage, the capacitor may be described as having per unit capacitance of 1. If the current drawn at the nominal AC voltage is less than the full load AC current for the power converter 800, however, the capacitor would have a per unit capacitance that is less than 1.

Figure 15:
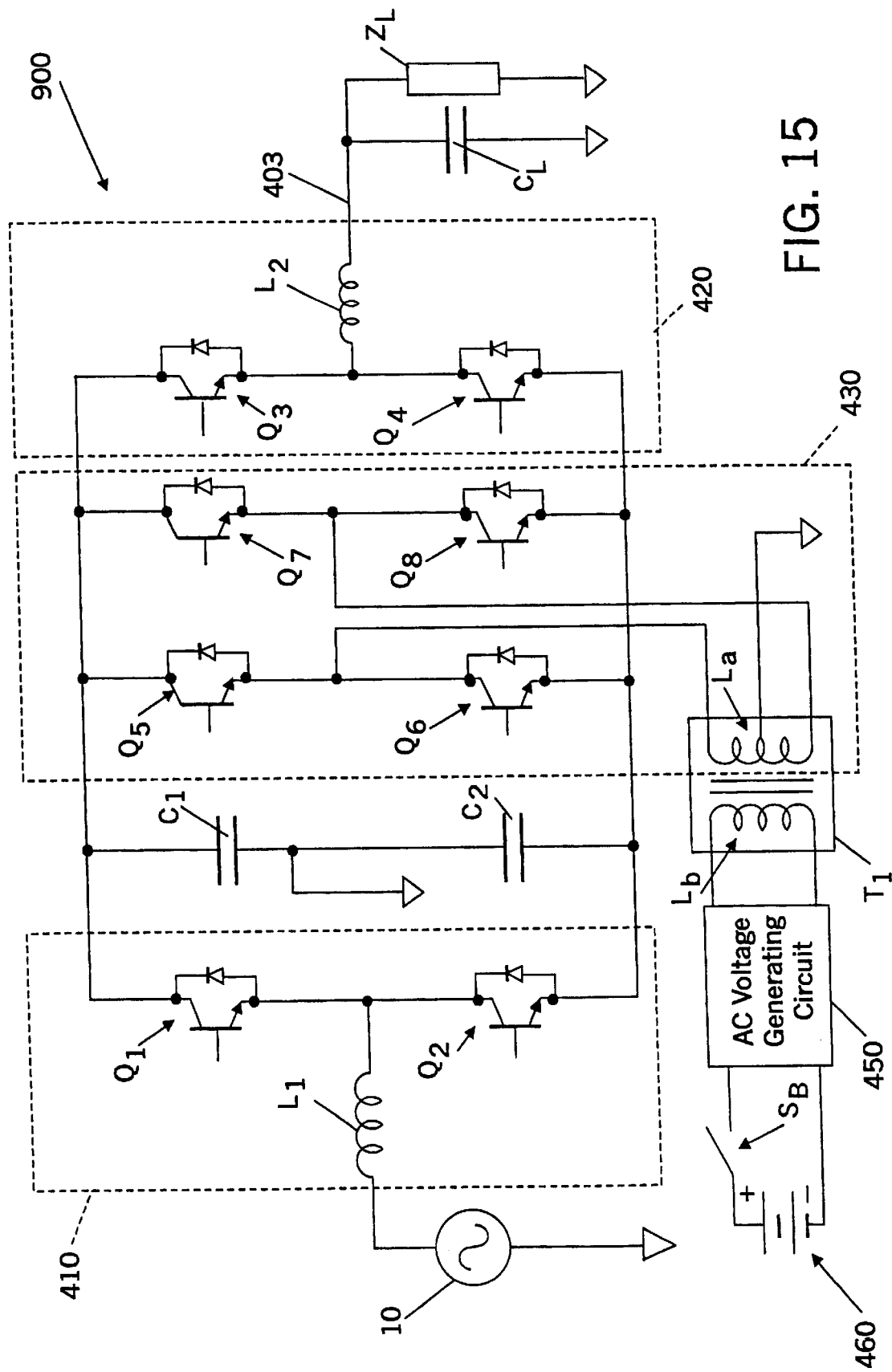
FIG. 15 is a schematic diagram illustrating a power converter according to another embodiment of the present invention.

It will be appreciated that the balancer circuit implementation of FIG. 13 utilizes a half-bridge configuration, and that similar functionality may be achieved using a full-bridge configuration. Referring to FIG. 15, in a power converter 900 according to another embodiment of the present invention, the diodes $D_1$, $D_2$ of FIG. 13 may be replaced by seventh and eighth switching transistors $Q_7$, $Q_8$, the switching operations of which may be controlled, for example, by a switch control circuit along the lines of the switch control circuit 440 of FIG. 5. It will be appreciated that the embodiments of FIGS. 13 and 15 represent exemplary implementations, and that other circuit implementations fall within the scope of the present invention. For example, the switching functions of the transistors $Q_1$, $Q_2$, $Q_3$, $Q_4$, $Q_5$, $Q_9$, $Q_7$, $Q_8$ may be provided by a variety of switching devices, such as those described above with reference to FIG. 5, controlled using any of a number of different control circuit implementations, such as those described above with reference to FIG. 5.

Figure 16:
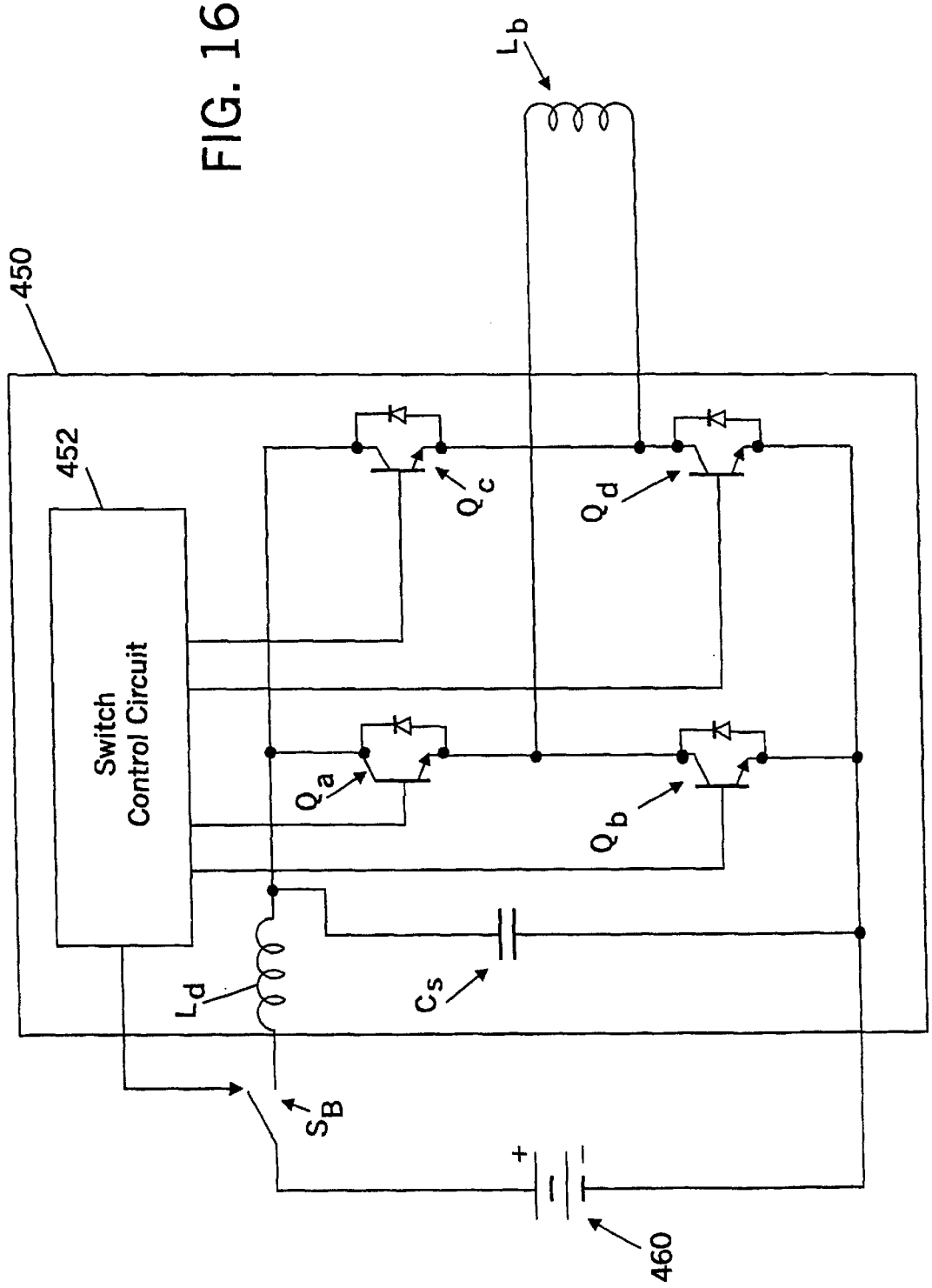
FIG. 16 is a schematic diagram illustrating an AC voltage generating circuit according to an embodiment of the present invention.

FIG. 16 illustrates an exemplary implementation of an AC voltage generating circuit 450 that may also act as a combined battery converter/battery charger circuit. The AC voltage generating circuit 450 includes four switching transistors $Q_a$, $Q_b$, $Q_c$, $Q_d$ connected in a bridge configuration between the transformer winding $L_b$ and the battery 460. The transistors $Q_a$, $Q_b$, $Q_c$, $Q_d$ are controlled by a switch control circuit 452. A current limiting inductor $L_{c1}$ is connected in series with the battery 460 and the switch $S_B$, and a storage capacitor $C_S$ is connected across the series combination.

The switch control circuit 452 may control switching operations of the transistors $Q_a$, $Q_b$, $Q_c$, $Q_d$ responsive to a variety of state inputs, such as a sensed voltage of the battery 460, and sensed AC input and output voltages for a battery converter in which the AC voltage generating circuit 450 is included. In a battery powered mode, for example, the switch control circuit 452 may be operated to selectively switch the transistors $Q_a$, $Q_b$, $Q_c$, $Q_d$ such that a DC voltage produced by the battery 460 across the storage capacitor $C_S$ is inverted, producing an AC voltage across the winding $L_b$. This may be achieved, for example, by switching a first pair of transistors $Q_a$, $Q_b$, in a complementary pattern to a second pair of transistors $Q_c$, $Q_d$ at the desired AC line frequency.

Referring to FIGS. 13 and 16, in a charging mode, an AC voltage may be applied to the first winding $L_a$ of the transformer $T_1$ by action of the fifth and sixth transistors 431, 432 of the balancer circuit 430, inducing an AC voltage on the second winding $L_b$. The switch control circuit 452 may selectively switch the transistors $Q_a$, $Q_b$, $Q_c$, $Q_d$ such that the AC voltage induced on the winding $L_b$ is rectified to produce a DC voltage across the storage capacitor $C_S$ that can be used to charge the battery 460. The magnitude of the voltage across the battery 460 can be controlled by the manner in which the transistors $Q_a$, $Q_b$, $Q_c$, $Q_d$ are operated, such that when the battery approaches a full charge the current flowing into the battery 460 can be reduced to avoid overcharging. Alternatively, the switch $S_B$ can be opened.

It will be appreciated that the embodiment of FIG. 16 represents an exemplary implementation, and that other circuit implementations fall within the scope of the present invention. For example, the switching functions of the transistors $Q_a$, $Q_b$, $Q_c$, $Q_d$ may be provided by any of a number of different switching devices such as those described in relation to FIG. 5, controlled using any of a number of different implementations of the switch control circuit 452, such as ones similar to those described for the switch control circuit 440 of FIG. 5. It will be appreciated that functions of the switch control circuits 440, 452 of FIGS. 5 and 16 may also be combined in one or more devices. It will further be understood that although the battery converter/battery charger circuit illustrated in 450 of FIG. 16 is capable of a combined rectifier/inverter operation in order provide battery charging in addition to generation of an AC voltage across the winding $L_b$, circuit implementations of the AC voltage generating circuit 450 which provide only inversion of the DC voltage produced by the battery may also be used with the present invention. Such a circuit may provide battery charging via an ancillary battery charging circuit (not shown).

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A power converter, comprising:

first and second voltage busses;

a neutral bus;

a first switching circuit operative to selectively couple an input node thereof to the first and second voltage busses;

a balancer circuit operative to selectively couple the neutral bus to the first and second voltage busses such that relative magnitudes of respective ones of the first and second voltages on the first and second voltage busses are controlled responsive to respective first and second rates at which the balancer circuit couples the first and second voltage busses to the neutral bus; and a second switching circuit operative to selectively couple the first and second voltage busses to a load connected at an output node thereof.

2. A converter according to claim 1:

wherein the first switching circuit comprises a rectifier circuit operative to produce respective ones of the first and second voltages on respective ones of the first and second voltage busses from an AC input voltage at the input node; and wherein the second switching circuit comprises an inverter operative to produce an AC output voltage at the output node from the first and second voltages.

3. A converter according to claim 2, wherein the balancer circuit comprises first and second switches operative to selectively couple respective ones of the first and second voltage busses to the neutral bus through an inductance such that the relative magnitudes of the first and second voltages are controlled responsive to respective first and second duty cycles of the first and second switches.

4. A converter according to claim 3, wherein the first switch is constrained to decouple the first voltage bus from the neutral bus when the second voltage bus is coupled to the neutral bus, and wherein the second switch is constrained to decouple the second voltage bus from the neutral bus when the first voltage bus is coupled to the neutral bus.

5. A converter according to claim 2, further comprising:

a first capacitor coupling the first voltage bus to the neutral bus; and a second capacitor coupling the second voltage bus to the neutral bus, wherein the first and second capacitors have a per unit capacitance of less than 1.

6. A converter according to claim 3, wherein the balancer circuit is operative to switch both of the first and second switches at 50% duty cycles to maintain the first and second voltages at substantially the same magnitude.

7. A converter according to claim 3, wherein the balancer circuit is responsive to an AC input voltage applied to the input node of the first switching circuit to vary the respective duty cycles at which the first and second switches operate.

8. A converter according to claim 7, wherein the balancer circuit is operative to switch the first switch at a higher duty cycle than the second switch for a first portion of a cycle of the AC input voltage and to switch the second switch at a higher duty cycle than the first switch for a second portion of the cycle of the AC input voltage.

9. A converter according to claim 3, wherein the balancer circuit comprises an inductor having a first terminal coupled to the neutral bus, and wherein the first and second switches are operative to selectively couple a second terminal of the inductor to respective ones of the first and second voltage busses.

10. A converter according to claim 2, further comprising a battery converter circuit switchably coupled to at least one of the first and second voltage busses.

11. A converter according to claim 10, wherein the battery converter circuit comprises:
an inductor configured to be connected in series with a battery;
a first switch operative to selectively couple one end of a series combination of a battery and the inductor to one of the first or second voltage busses; and
a second switch operative to selectively couple the one end of the series combination of a battery and an inductor to another end of the series combination of a battery and the inductor.

12. A converter according to claim 3, wherein the balancer circuit comprises a transformer including a first winding having a first tap coupled to the first and second switches and a second tap coupled to the neutral bus, and wherein the first and second switches selectively couple the first tap of the transformer to the first and second voltage busses.

13. A converter according to claim 12, further comprising first and second diodes, the first diode having a cathode coupled to the first voltage bus, the second diode having a cathode coupled to an anode of the first diode and an anode coupled to the second voltage bus, and wherein the first winding of the transformer has a first end tap coupled to the first and second switches, a second end tap coupled to the anode of the first diode and the cathode of the second diode, and a center tap coupled to the neutral bus.

14. A converter according to claim 12, further comprising third and fourth switches, wherein the first winding of the transformer has a first end tap coupled to the first and second switches, a second end tap coupled to the third and fourth switches, and a center tap coupled to the neutral bus, wherein the third switch is operative to couple and decouple the second end tap of the first winding and the first voltage bus, and wherein the fourth switch is operative to couple and decouple the second end tap of the first winding and the second voltage bus.

15. A converter according to claim 12, wherein the transformer comprises a second winding inductively coupled to the first winding, and further comprising an AC voltage generating circuit coupled to the second winding of the transformer and operative to apply an AC voltage thereto.

16. A converter according to claim 15, wherein the AC voltage generating circuit comprises a battery converter circuit operative to generate an AC voltage on the second winding of the transformer from a DC voltage produced by a battery coupled to the battery converter circuit.

17. A converter according to claim 15, wherein the AC voltage generating circuit comprises a combined battery converter/battery charger circuit that is operative to generate an AC voltage on the second winding of the transformer from a DC voltage produced by the battery, and to produce a DC voltage across the battery from an AC voltage induced on the second winding of the transformer.

18. A power converter, comprising:
a rectifier circuit configured to connect to an AC power source and operative to produce first and second DC voltages at first and second voltage busses, respectively, by selectively coupling the first and second voltage busses to the AC power source through a first inductance;
first and second capacitors coupling the first and second voltage busses, respectively, to a neutral bus;
an inverter circuit configured to connect to a load and operative to selectively couple the first and second voltage busses to the load through a second inductance; and
a balancer circuit operative to selectively couple the first and second voltage busses to the neutral bus through a third inductance such that relative magnitudes of the first and second DC voltages are controlled responsive to respective first and second rates at which the balancer circuit couples the first and second voltage busses to the neutral bus.

19. A converter according to claim 18, further comprising a switch control circuit, and:
wherein the rectifier circuit comprises:
a first inductor having a first terminal configured to receive an AC input voltage;
a first switch responsive to the switch control circuit to couple and decouple a second terminal of the first inductor and the first voltage bus; and
a second switch responsive to the switch control circuit to couple and decouple the second terminal of the first inductor and the second voltage bus; and
wherein the inverter circuit comprises:
a second inductor having a first terminal configured to connect to a load;
a third switch responsive to the switch control circuit to couple and decouple a second terminal of the second inductor and the first voltage bus; and
a fourth switch responsive to the switch control circuit to couple and decouple the second terminal of the second inductor and the second voltage bus.

20. A converter according to claim 19, wherein the switch control circuit is responsive to an AC input voltage applied to the rectifier circuit to control operation of the first, second, third and fourth switches.

21. A converter according to claim 20, wherein the switch control circuit is operative to vary respective duty cycles at which the first, second, third and fourth switches are operated responsive to the AC input voltage.

22. A converter according to claim 20:
wherein the switch control circuit is operative, when the AC input voltage is at a nominal level, to provide a substantially continuous low impedance connection between the AC power source and the load through the rectifier and inverter circuits;
wherein the switch control circuit is operative, when the AC input voltage is less than the nominal level, to cause the rectifier circuit to boost the magnitudes of the first and second DC voltages while providing respective substantially continuous low impedance connections between the load and respective ones of the first and second voltages busses through the inverter circuit during respective positive and negative half-cycles of the AC input voltage; and wherein the switch control circuit is operative, when the AC input voltage is greater than the nominal level, to provide respective substantially continuous low-impedance connections between the AC power source and respective ones the first and second voltage busses through the rectifier circuit during respective positive and negative half-cycles of the AC input voltage, while causing the inverter circuit to buck the magnitude of a voltage generated at the load from the first and second DC voltages.

23. A converter according to claim 22, wherein the switch control circuit is operative to control the balancer circuit such that the magnitude of the first DC voltage is substantially greater than the magnitude of the second DC voltage during a positive half-cycle of the AC input voltage and such that the magnitude of the second DC voltage is substantially greater than the magnitude of the first DC voltage during a negative half-cycle of the AC input voltage.

24. A converter according to claim 20:

wherein the switch control circuit is operative, when the AC input voltage is at a nominal level, to:
switch the first and second switches at substantially complementary duty cycles of approximately 100% and approximately 0%, respectively, while switching the third and fourth switches at substantially complementary duty cycles of approximately 100% and approximately 0%, respectively, during a first positive half-cycle of the AC input voltage; and
switch the first and second switches at substantially complementary duty cycles of approximately 0% and approximately 100%, respectively, while switching the third and fourth switches at substantially complementary duty cycles of approximately 0% and approximately 100%, respectively, during a first negative half-cycle of the AC input voltage;

wherein the switch control circuit is operative, when the AC input voltage is at less than the nominal level, to:
switch the first and second switches at substantially complementary duty cycles sufficiently less than 100% and sufficiently greater than 0%, respectively, to boost the magnitude of the first DC voltage, while switching the third and fourth switches at substantially complementary cycles of approximately 100% and approximately 0%, respectively, during a second positive cycle of the AC input voltage; and
switch the first and second switches at substantially complementary duty cycles sufficiently greater than 0% and sufficiently less than 0%, respectively, to boost the magnitude of the second DC voltage, while switching the third and fourth switches at substantially complementary duty cycles of approximately 0% and approximately 100%, respectively, during a second negative half-cycle of the AC input voltage; and wherein the switch control circuit is operative, when the AC input voltage is greater than the nominal level, to:
switch the first and second switches at substantially complementary duty cycles of approximately 100% and approximately 0%, respectively, while switching the third and fourth switches at substantially complementary cycles sufficiently less than 100% and sufficiently greater than 0%, respectively, to buck a voltage applied to the load, during a third positive cycle of the AC input voltage; and
switch the first and second switches at substantially complementary duty cycles of approximately 0% and approximately 100%, respectively, while switching the third and fourth switches at substantially complementary cycles sufficiently greater than 0% and sufficiently less than 100%, respectively, to buck a voltage applied to the load, during a third negative cycle of the AC input voltage.

25. A converter according to claim 24:

wherein the balancer circuit comprises:
a third inductor having a first terminal coupled to the neutral bus;
a fifth switch responsive to the switch control circuit to couple and decouple a second terminal of the third inductor and the first voltage bus; and
a sixth switch responsive to the switch control circuit to couple and decouple the second terminal of the third inductor and the second voltage bus; and wherein the switch control circuit is operative to:
switch the fifth and sixth switches at complementary duty cycles of approximately 0% and approximately 100%, respectively, during the second and third positive half-cycles and to switch the fifth and sixth switches at complementary duty cycles of approximately 100% and approximately 0%, respectively, during the second and third negative half-cycles.

26. A converter according to claim 19, wherein the balancer circuit comprises:
a third inductor having a first terminal coupled to the neutral bus;
a fifth switch responsive to the switch control circuit to couple and decouple a second terminal of the third inductor and the first voltage bus; and
a sixth switch responsive to the switch control circuit to couple and decouple the second terminal of the third inductor and the second voltage bus.

27. A converter according to claim 26, wherein the switch control circuit is responsive to an AC input voltage applied to the rectifier circuit to control operation of the first, second, third, fourth, fifth and sixth switches.

28. A converter according to claim 27, wherein the switch control circuit is operative to vary respective duty cycles at which the first, second, third, fourth, fifth and sixth switches are operated responsive to the AC input voltage.

29. A converter according to claim 19, further comprising a battery coupling circuit operative to couple and decouple a battery and the first terminal of the first inductor.

30. A converter according to claim 19, further comprising a battery coupling circuit operative to selectively couple a battery to one of the first voltage busses and the neutral bus.

31. A converter according to claim 26, wherein the third inductor comprises a first winding of a transformer, the transformer having a second winding inductively coupled to the first winding, and further comprising an AC voltage generating circuit coupled to the second winding of the transformer, configured to connect to a battery, and operative to generate an AC voltage on the second winding of the transformer from a DC voltage produced by the battery.

32. A converter according to claim 31:

wherein the balancer circuit is operative to produce a first AC voltage on the first winding of the transformer; and
wherein the AC voltage generating circuit is operative to charge a battery connected thereto from a second AC voltage induced on the second winding of the transformer by the first AC voltage.

33. A method of controlling power transfer between and an AC power source that produces an AC input voltage between a phase bus and a neutral bus, the method comprising the steps of:

selectively coupling first and second voltage busses to the phase bus through a first inductance to produce first and second DC voltages at first and second voltage busses, respectively;

selectively coupling the first and second voltage busses to the load through a second inductance; and selectively coupling the first and second voltage busses to the neutral bus through a third inductance such that relative magnitudes of the first and second DC voltages are controlled responsive to respective first and second rates at which the first and second voltage busses are coupled to the neutral bus.

34. A method according to claim 33:

wherein said step of selectively coupling first and second voltage busses to the phase bus comprises the steps of:
switching a first switch to couple and decouple the phase bus and the first voltage bus through a first inductor; and
switching a second switch to couple and decouple the phase bus and the second voltage bus through the first inductor;

wherein said step of selectively coupling the first and second voltage busses to a load comprises the steps of:
switching a third switch circuit to couple and decouple the first voltage bus and the load through a second inductor; and
switching a fourth switch to couple and decouple the second voltage bus and the load bus through the second inductor.

35. A method according to claim 34, wherein said switching steps are performed responsive to the AC input voltage.

36. A method according to claim 35, further comprising the step of varying respective duty cycles at which the first, second, third and fourth switches are operated responsive to the AC input voltage.

37. A method according to claim 35, comprising the steps of:
providing a substantially continuous low impedance connection between the phase bus and the load through selected combinations of the first, second, third and fourth switches when the AC input voltage is approximately at a nominal level;
switching the first and second switches to boost the magnitudes of the first and second DC voltages while providing respective substantially continuous low impedance connections between the load and respective ones of the first and second voltages busses through respective ones of the third and fourth switches during respective positive and negative half-cycles of the AC input voltage, when the AC input voltage is less than the nominal level; and
providing respective substantially continuous low-impedance connections between the AC power source and respective ones the first and second voltage busses through respective ones of the first and second switches during respective positive and negative half-cycles of the AC input voltage, while bucking a voltage generated at the load from the first and second DC voltages, when the AC input voltage is greater than the nominal level.

38. A method according to claim 37, wherein said step of selectively coupling the first and second voltage busses to the neutral bus comprises the step of switching fifth and sixth switches that couple and decouple respective ones of the first and second voltage busses and the neutral bus through a third inductor, such that the magnitude of the first DC voltage is substantially greater than the magnitude of the second DC voltage during a positive half-cycle of the AC input voltage and such that the magnitude of the second DC voltage is substantially greater than the magnitude of the first DC voltage during a negative half-cycle of the AC input voltage.

39. A method according to claim 35, comprising the steps of:
when the AC input voltage is at a nominal level:
switching the first and second switches at substantially complementary duty cycles of approximately 100% and approximately 0%, respectively, while switching the third and fourth switches at substantially complementary duty cycles of approximately 100% and approximately 0%, respectively, during a first positive half-cycle of the AC input voltage; and
switching the first and second switches at substantially complementary duty cycles of approximately 0% and approximately 100%, respectively, while switching the third and fourth switches at substantially complementary duty cycles of approximately 0% and approximately 100%, respectively, during a first negative half-cycle of the AC input voltage;
when the AC input voltage is less than the nominal level:
switching the first and second switches at substantially complementary duty cycles sufficiently less than 100% and sufficiently greater than 0%, respectively, to boost the magnitude of the first DC voltage, while switching the third and fourth switches at substantially complementary cycles of approximately 100% and approximately 0%, respectively, during a second positive cycle of the AC input voltage; and
switching the first and second switches at substantially complementary duty cycles sufficiently greater than 0% and sufficiently less than 100%, respectively, to boost the magnitude of the second DC voltage, while switching the third and fourth switches at substantially complementary cycles of approximately 0% and approximately 100%, respectively, during a second negative half-cycle of the AC input voltage; and
when the AC input voltage is greater than the nominal level, to:
switching the first and second switches at substantially complementary duty cycles of approximately 100% and approximately 0%, respectively, while switching the third and fourth switches at substantially complementary cycles sufficiently less than 100% and sufficiently greater than 0%, respectively, to buck a voltage applied to the load, during a third positive cycle of the AC input voltage; and
switching the first and second switches at substantially complementary duty cycles of approximately 0% and approximately 100%, respectively, while switching the third and fourth switches at substantially complementary cycles sufficiently greater than 0% and sufficiently less than 100%, respectively, to buck a voltage applied to the load, during a third negative cycle of the AC input voltage.

40. A method according to claim 39, wherein said step of selectively coupling the first and second voltage busses to the neutral bus comprises the steps of:
switching fifth and sixth switches that couple and decouple respective ones of the first and second voltage busses and the neutral bus through a third inductor at complementary duty cycles of approximately 0% and approximately 100%, respectively, during the second and third positive half-cycles; and switching the fifth and sixth switches at complementary duty cycles of a approximately 100% and approximately 0%, respectively, during the second and third negative half-cycles.

41. A method according to claim 34, wherein said step of selectively coupling the first and second voltage busses to the neutral bus comprises the steps of:

switching a fifth switch to couple and decouple the first voltage bus and the neutral bus through a third inductor; and switching a sixth switch to couple and decouple the second voltage bus and the neutral bus through the third inductor.

42. A method according to claim 33, further comprising the step of selectively coupling a battery to at least one of the first inductance, the first voltage bus, or the second voltage bus to enable power transfer between the battery and the first and second voltage busses.

* * * * *